(12) United States Patent
Imada et al.

(10) Patent No.: US 6,873,584 B2
(45) Date of Patent: Mar. 29, 2005

(54) DISK REPRODUCING APPARATUS AND DISK REPRODUCING METHOD

(75) Inventors: Masayuki Imada, Hiroshima-Ken (JP);
Yoichi Yamamoto, Hiroshima (JP);
Masahiro Kawasaki, Hiroshima (JP);
Yoshinori Imanishi, Hiroshima (JP);
Toru Suetomo, Higashihiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 625 days.

(21) Appl. No.: 09/863,386

(22) Filed: May 24, 2001

(65) Prior Publication Data
US 2001/0046191 A1 Nov. 29, 2001

(30) Foreign Application Priority Data
May 24, 2000 (JP) ........................................ 2000-152378

(51) Int. Cl.$^7$ ................................................ G11B 5/09
(52) U.S. Cl. ................................ 369/53.16; 369/47.14
(58) Field of Search ........................... 369/47.14, 53.15, 369/53.16, 53.17; 714/5, 7, 8

(56) References Cited

U.S. PATENT DOCUMENTS

| | | | | |
|---|---|---|---|---|
| 6,182,240 B1 | * | 1/2001 | Mine | 714/5 |
| 6,414,923 B1 | * | 7/2002 | Park et al. | 369/53.15 |
| 6,418,100 B1 | * | 7/2002 | Park et al. | 369/47.14 |

* cited by examiner

*Primary Examiner*—Thang V. Tran
(74) *Attorney, Agent, or Firm*—McDermott Will & Emery LLP

(57) ABSTRACT

A disk reproducing apparatus and a disk reproducing method which permit continuous reproduction of data of the RTR type without interruption and without affecting real time reproduction.

A defective block list with defective blocks and alternative blocks registered linked to each other by the types of defective blocks has been acquired beforehand from a recording medium and when there arises need to read a defective block, its alternative block is read out and forwarded to a reproduction requester. Here, reading control means identifies the type of defective blocks registered on the defective block list and controls the reading according to the identification results.

16 Claims, 27 Drawing Sheets

(A)

(B)

(C)

(B)

DEFECTIV BLOCK LIST

| SLR FLAG | ADDRESS OF DEFECTIVE BLOCK | ADDRESS OF ALTERNATIVE BLOCK | |
|---|---|---|---|
| 0 | ADDRESS α | ADDRESS β | } ① |
| 1 | ADDRESS A | NO ALTERNATIVE BLOCK AVAILABLE | } ② |
| 1 | ADDRESS A + 4 | NO ALTERNATIVE BLOCK AVAILABLE | |
| 1 | ADDRESS A + 12 | NO ALTERNATIVE BLOCK AVAILABLE | |

FIG.4

(A) ) READ COMMAND

| TYPE | OFFSET | DETAILS |
|---|---|---|
| COMMAND | 0 | CODE VALUE TO INDICATE READ COMMAND |
| PARAMETER | 1 | OPTION CODE |
| | 2 | |
| | 3 | BUFFER PAGE ADDRESS |
| | 4 | |
| | 5 | NUMBER OF PAGES PROCESSED |
| | 6 | |
| | 7 | HEAD ADDRES |
| | 8 | |
| | 9 | |
| | 10 | |

(B) ) SDL SETTING COMMAND

| TYPE | OFFSET | DETAILS |
|---|---|---|
| COMMAND | 0 | CODE VALUE TO INDICATE SDL SETTING COMMAND |
| PARAMETER | 1 | OPTION CODE |
| | 2 | |
| | 3 | PDL POINTER |
| | 4 | |
| | 5 | |
| | 6 | SDL POINTER |
| | 7 | |
| | 8 | |

FIG.14

| BIT BYTE | 7 | 6 | 5 | 4 | 3 | 2 | 1 | 0 |
|---|---|---|---|---|---|---|---|---|
| 0 | CODE VALUE TO INDICATE REPRODUCTION REQUEST | | | | | | | |
| 1 | | | | | | | | |
| 2 | HEAD ADDRESS OF REPRODUCTION DATA | | | | | | | |
| 3 | | | | | | | | |
| 4 | | | | | | | | |
| 5 | | | | | | | | |
| 6 | LENGTH OF REPRODUCTION DATA | | | | | | | |
| 7 | | | | | | | | |
| 8 | | | | | | | | |
| 9 | | | | | | | | |
| 10 | FLAG INDICATING THAT "REAL TIME REPRODUCTION IS IMPORTANT" | | | RESERVED AREA | | | | |
| 11 | | | | | | | | |

DISK REPRODUCING APPARATUS AND DISK REPRODUCING METHOD

BACKGROUND OF THE INVENTION

1. Field of the Invention

The present invention relates to a disk reproducing apparatus and a disk reproducing method.

2. Prior Art

A function called shock proofing is known which is provided in apparatuses for reproducing music, image data or the like recorded on recording media, hard disc for example (hereinafter referred to as "disk reproducing apparatus"). This shock proofing function is a function of preventing data from skipping because of shock or the like as explained below.

The idea is to have data pre-read from a recording medium to a memory in a disk reproducing apparatus at a higher speed than the ordinary reproducing speed beforehand. And later, the data is read out from the memory and reproduced. That could keep data from skipping even if a shock occurs while data stored on the memory is reproduced. In other words, that could bring back the pickup to an original position to read data again if a shock occurs.

A disk reproducing apparatus provided with a shock proofing function has also a feature of reproducing data precisely. That is, in case a reading error like data error occurs, reading this error block will be retried. But it is usual that this retrial will be made only when pre-read data is stored on the memory.

Meanwhile, the Real-Time Recording/Playback(RTR) standards (Mt. Fuji Commands for Multimedia Device SFF8090i v4) attract attention as standards on the recording of such data as music and images on such recording media as DVD-RAM and DVD-R. Such data as music and images are to be continuously recorded. It is more important that data of the RTR type should continue to be reproduced uninterruptedly rather than being reproduced precisely. For this reason, in case a block where recording is made is a defective block, data of the RTR type is treated in a way different from that for ordinary data as explained below.

That is, for ordinary data to be recorded on a defective block, SLR flag "0," defective block address $\alpha$ and alternative block address $\beta$ are registered linked to each other in advance as shown in FIG. 3(b) ①. For data of the RTR type to be recorded on a defective block, meanwhile, SLR flag "1," defective block address A and NULL data are registered linked to each other in advance as shown in FIG. 3(b) ②.

The alternative block is a reserve block to replace the defective block where data is recorded. The SLR (status of linear replacement) flag is a flag to indicate whether the defective block is replaced; "0" shows that the defective block is replaced while "1" indicates that no replacement is made.

In other words, ordinary data is recorded on the alternative block while data of the RTR type is recorded on the defective block. Naturally, there is no need to ensure that data of the RTR type is written on a defective block correctly.

Under that arrangement, ordinary data is reproduced this way. When data is reproduced up to address $\alpha-1$, address $\beta$ is sought, and the alternative block at this address $\beta$ is reproduced, the pickup returns to address $\alpha+1$ and reproduces data from that point. In reproducing the RTR type, meanwhile, if data is reproduced up to address A-1, data after address A will be reproduced sequentially.

That is, for data of the RTR type, it is more important that data continue to be reproduced uninterruptedly rather than precisely, and once address A is read as mentioned above, this data may be forwarded to the reproduction requester (host computer, for example) even if a reading error like data error occurs.

In a disk reproducing apparatus provided with a shock proofing function, the system is so designed that if a reading error like data error occurs, reading this error block will be retried so that data is read precisely as mentioned above. In other words, according to the prior art, when address A is read and a reading error like data error occurs, reading this error block will be retried.

However, the address A is an address of a defective block with data of the RTR type recorded thereon (hereinafter referred to as "RTR defective block"), and if reading is retried like that, it is almost certain that data can not be read correctly.

Namely, in reproducing recording media such as CD and DVD-ROM in which defective blocks are not controlled with a defective block list, it is not known whether a block with a reading error can be read or not, and it is useful to retry reading this error block.

On the other hand, to retry reading an RTR defective block is to retry reading data recorded on the defective block, and it can hardly be said that it is useful. Furthermore, to retry reading like that could affect real time reproduction and make it impossible to reproduce data of the RTR type uninterruptedly.

SUMMARY OF THE INVENTION

In view of the prior art described above, it is an object of the present invention to provide a disk reproducing apparatus and a disk reproducing method that permit reproducing data of the RTR type uninterruptedly without affecting real time reproduction. That is, the present invention is built on a disk reproducing apparatus in which with a defective block list acquired from a recording medium, an alternative block will be read and forwarded to the reproduction requester when it is necessary to read a defective block from the recording medium. The defective block list has information linking defective blocks and alternative blocks registered along with the types of defective blocks.

Here, reading control means identifies the type of a defective block registered on the defective block list and controls reading according to the identification results.

That is, in case the block to be read is a defective block of the RTR type, the reading control means will control reading so as to read not the defective block but the next block. That makes it possible to continue to reproduce data of the RTR type uninterruptedly without affecting real time reproduction and to reproduce ordinary data correctly as in the prior art.

The system may be so arranged that if the reading control means finds that the block read is a defective block and reading the defective block is an error, the reading control means controls reading so as to read on to the next block without interruption.

The system may also be so configured that if the reading control means finds that the block read is a defective block, the means controls reading so as to read the next block without retrying reading the defective block.

Furthermore, it may be so configured that if the reading control means finds that the block read is a defective block, the means controls reading so as to retry reading the defective block a specific number of times.

Also, it may be configured this way. The reading control means works out the number of reading retrials per defective block on the basis of the number of the pre-read blocks, the number of blocks to be pre-read and the number of defective blocks present among the blocks to be pre-read. Reading the defective block will be retried a maximum of that number of times.

It may be configured this way, too. The reading control means works out the number of reading retrials per defective block on the basis of the distribution ratio of defective blocks, the speed at which blocks are read from a recording medium, and the speed at which the read block is forwarded to the reproduction requester. Reading the defective block will be retried a maximum of that number of times.

It is described above that since it is necessary to distinguish defective blocks of the RTR type from defective blocks of ordinary data so as to permit reproducing data of the RTR type uninterruptedly and to reproduce ordinary data correctly, a defective block list is used. However, if it becomes possible for a host computer wishing to have data continuing to be read uninterruptedly to indicate that by a parameter of a reproduction request (which is expected to be standardized in RTR), it will not be necessary to use the defective block list as described above.

But the above-described reading control may be utilized when the host computer just wishes to have data continuing to be reproduced uninterruptedly.

BRIEF DESCRIPTION OF THE DRAWINGS

Having summarized the invention, a detailed description of the invention follows with reference being made to the accompanying drawings which form part of the specification, of which:

FIG. 4 shows examples of the command issued by CPU to an optical disk controller.

FIG. 14 is an example of the reproduction request form issued by the host computer to the disk reproducing apparatus.

DESCRIPTION OF THE PREFERRED EMBODIMENTS

Figure 1:
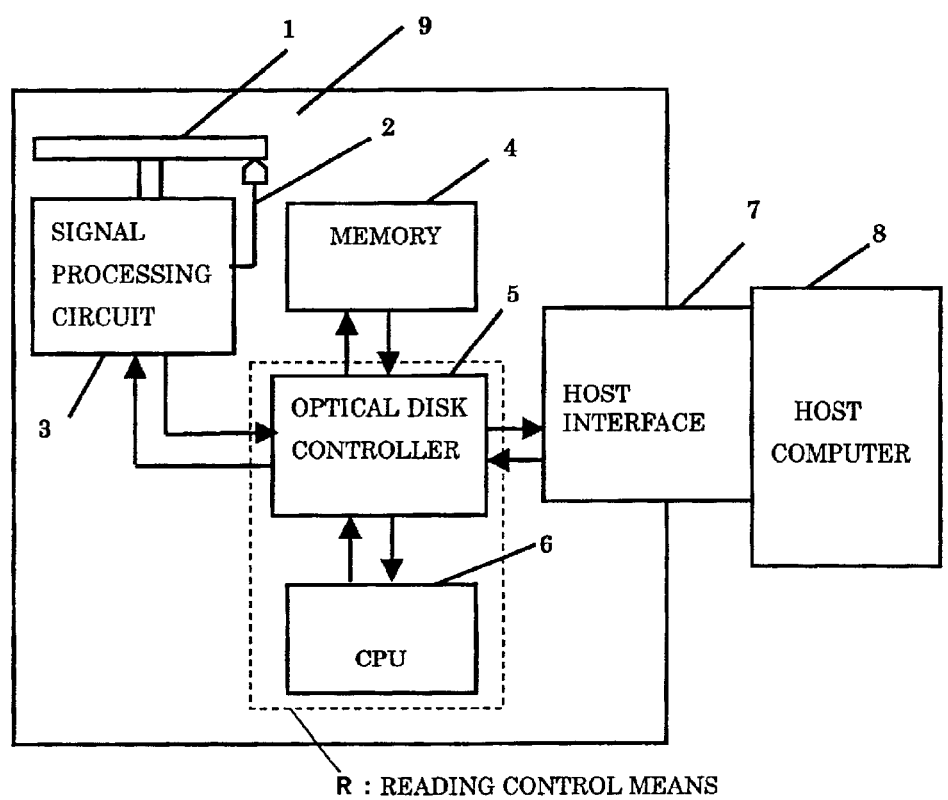
FIG. 1 is a block diagram of a disk reproducing apparatus to which the present invention is applied.

FIG. 1 is a block diagram of a disk reproducing apparatus to which the present invention is applied. The configuration and operation will be explained. The following description presupposes that a defective block list (hereinafter abbreviated as "SDL" in some places) is stored on a memory 4. The time of storing the defective block list is not restricted in particular but it is usual that it is when a recording medium is loaded. In other words, the system is so arranged that as a recording medium 1 is loaded in a disk reproducing apparatus 9, CPU 6 acquires a defective block list recorded on the recording medium 1 and stores the list on the memory 4.

First, a host computer 8 sends a reproduction request to the disk reproducing apparatus 9. Receiving the reproduction request through a host interface 7 and an optical disk controller 5, CPU 6 issues to a signal processing circuit 3 a direction to have a pickup seek an object address on the recording medium 1.

Then, when the pickup 2 reaches the object address, CPU 6 directs the optical disk controller 5 to read out data from the recording medium 1 on to the memory 4. So directed, the optical disk controller 5 informs CPU 6 of the reading state (buffering state) each time one block is read out on to the memory 4 from the recording medium 1.

It is noted that this reading control, especially control of defective block processing—which will be described later—is the essential part of the present invention and that different techniques as will be described later are adopted to make it possible to reproduce data of the RTR type uninterruptedly without affecting real time reproduction. In the following description, either of CPU 6 and the optical disk controller 5 or both called "reading control means R" in some places.

Then knowing that a specific amount of data is stored on the memory 4, CPU 6 directs the optical disk controller 5 to forward the data to the host interface 7 at a specific speed.

But the system is so arranged that when the buffer of the memory 4 is full, CPU 6 directs the optical disk controller 5 to suspend buffering. Alternatively, it may be so configured that the optical disk controller 5 finds the buffer full and stop buffering, and informs CPU 6 to the effect.

Here, even if the buffering is suspended as mentioned above, data continues to be forwarded from the host interface 7 to the host computer 8. Therefore, when the memory 4 comes to have available space, CPU 6 directs the signal processing circuit 3 to have the pickup 2 seek the address just after one where the buffering was suspended, and at the same time issues to the optical disk controller 5 a direction to resume buffering.

The choice after that is to finish reproducing data of the length requested by the host computer 8, or to have the pickup 2 arrive at the last address of the recording medium 1, or to repeat buffering until an error occurs for some reason.

In the present invention, as set forth above, the system is so arranged that data is pre-read on to the memory 4 from the recording medium 1 at a speed higher than the ordinary reproduction speed beforehand, and later data is read out from this the memory 4 and forwarded to the host computer 8 at the ordinary speed. Through this arrangement, even if the pickup 2 moves as by shock, it is possible to absorb data skipping while forwarding to the host computer 8 data stored on the memory 4.

Figure 2:
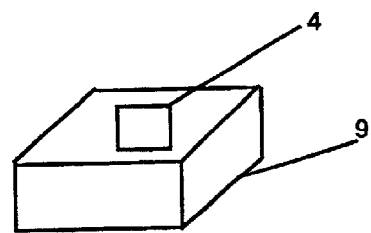
FIG. 2 shows examples of the disk reproducing apparatus to which the present invention is applied.
Figure 2:
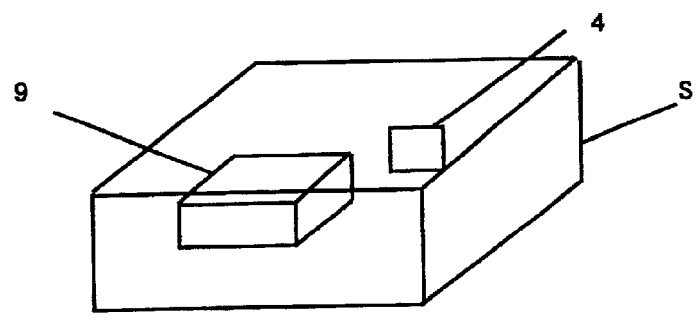
Figure 2:
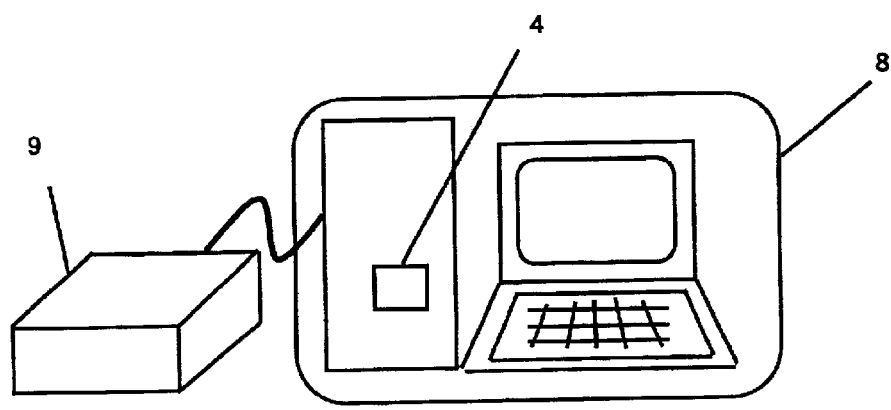

In the present embodiment, an example where the memory 4 is built in the disk reproducing apparatus 9 is shown as in FIG. 2(a), but the present invention is not limited thereto. As an alternative to that, the disk reproducing apparatus 9 may be provided on the side of the disk reproducing system S which is incorporated as unit, or on the side of the host computer 8 connected to the disk reproducing apparatus 9 as shown in FIG. 2(c).

Now, the operation of the reading control means R that controls the reading will be explained in detail.

Embodiment 1

Figure 5:
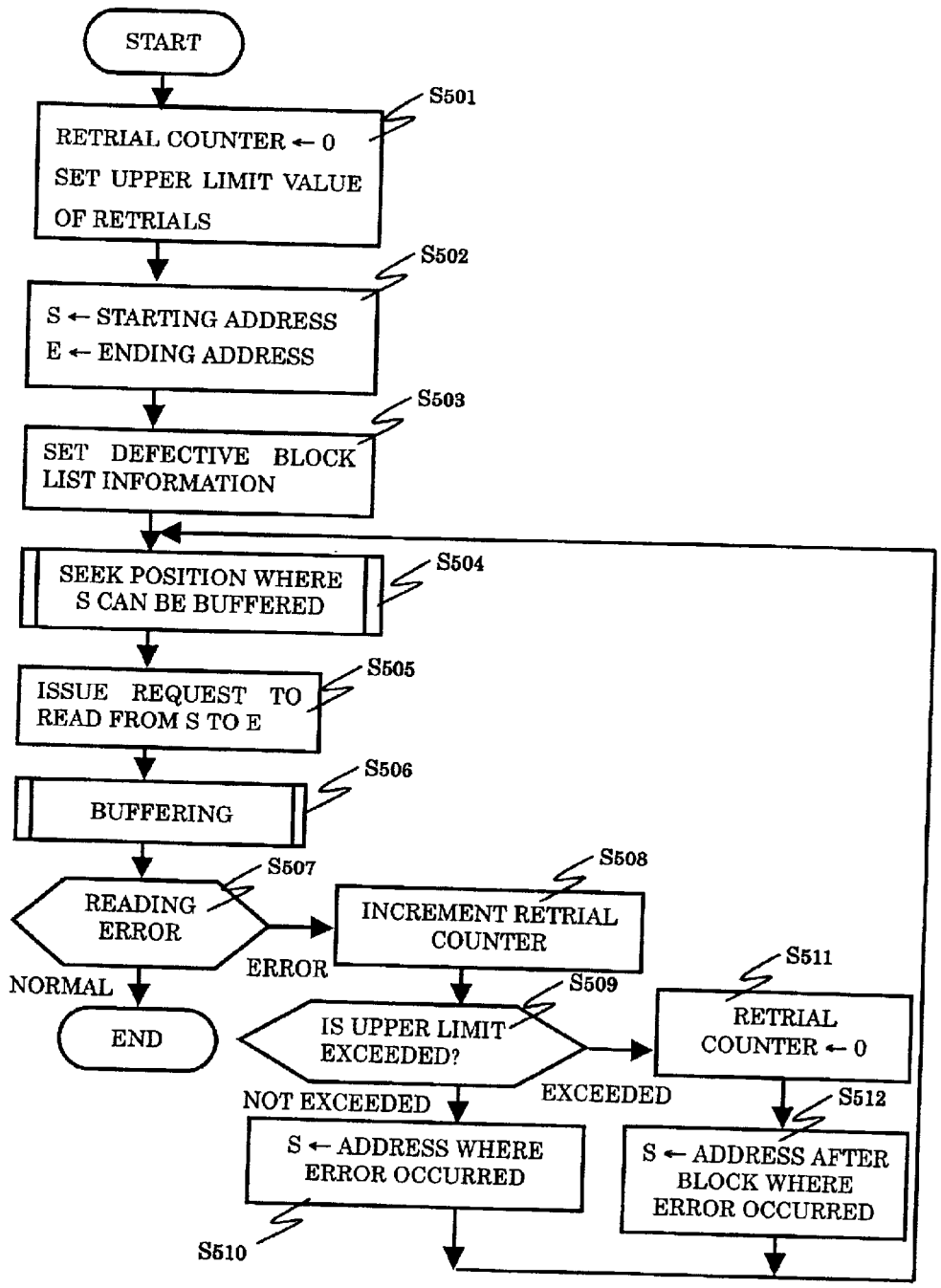
FIG. 5 is a flow chart showing the operations of CPU in Embodiments 1 and 3.

First, CPU 6 initializes a retrial counter (FIG. 5, Step S501). The read-starting address is substituted for variable S, and the last reading-ending address is substituted for variable E (FIG. 5, Step S502). For the sake of pre-reading, a larger value than the last reading ending address may be substituted for the variable E.

In the next step, CPU 6 sets the contents of the defective block list acquired from the recording medium 1 on the optical disk controller 5 (FIG. 5, Step S503).

An example of the defective block list setting command is shown in FIG. (b). This command is made up of "command" field and a number of "parameter" fields. In the "command" field, a code value is specified that indicates a defective block list setting command.

In the "SDL pointer" field included in the "parameter," the SDL entry position is specified. That is, CPU 6 searches the defective block list for an entry where an address larger than the address to be read is recorded and specifies that entry position in the "SDL pointer" field.

The "option code" field included in the "parameter" field will be described later. The "PDL" field is not directly related to the present invention and will not be explained.

That sets the contents of the defective block list on the register of the optical disk controller 5, and the optical disk controller 5 processes defective blocks on the basis of the contents of the defective block list (which will be described later).

Then, CPU 6 gives to the signal processing circuit 3 a direction to have the pickup 2 seek the address on the recording medium 1 represented by the variable S (FIG. 5, Step S504), and issues a read request (hereinafter referred to as "read command") to the optical disk controller 5 (FIG. 5, Step S505).

An example of the lead command form is shown in FIG. 4(a).

That is, this command is made up of the "command" field and a number of the "parameter" fields. In the "command" field, a code value to indicate the read command is specified. In the "the head address" field included in the "parameter" field, the contents of the variable S are specified. In the "the number of processing pages" field, a value obtained by S–E+1 is specified. In the "buffer page address" field, the position on the memory 4 is specified where data read out from the recording medium 1 is written.

In the next step, buffering (FIG. 5, Step S506) is performed by the optical disk controller 5. When the buffering is finished, the ending status information is sent to CPU 6. Buffering will be described in detail later.

With that, CPU 6 ends reading if the ending status information indicates normal ending (FIG. 5, Step S507). If the ending status is an error ending, the retrial counter is incremented, and then it is judged if the retrial counter has exceeded the predetermined upper limit of retrials (FIG. 5, Steps S508→S509).

If the retrial counter has not exceeded the upper limit of retrials, CPU 6 issues to the optical disk controller 5 a read command to read the block where the reading error occurred (FIG. 5, Steps S510→S504→S505→S506→S507). If, on the other hand, the retrial counter has exceeded the upper limit of retrials, CPU 6 will give up reading the block where the reading error occurred and will issue to the optical disk controller 5 a read command to read the next block (FIG. 5, Steps S511→S512→S504→S505→S506→S507).

Next, the operation of the optical disk controller 5 will be explained with reference to FIG. 6.

Figure 6:
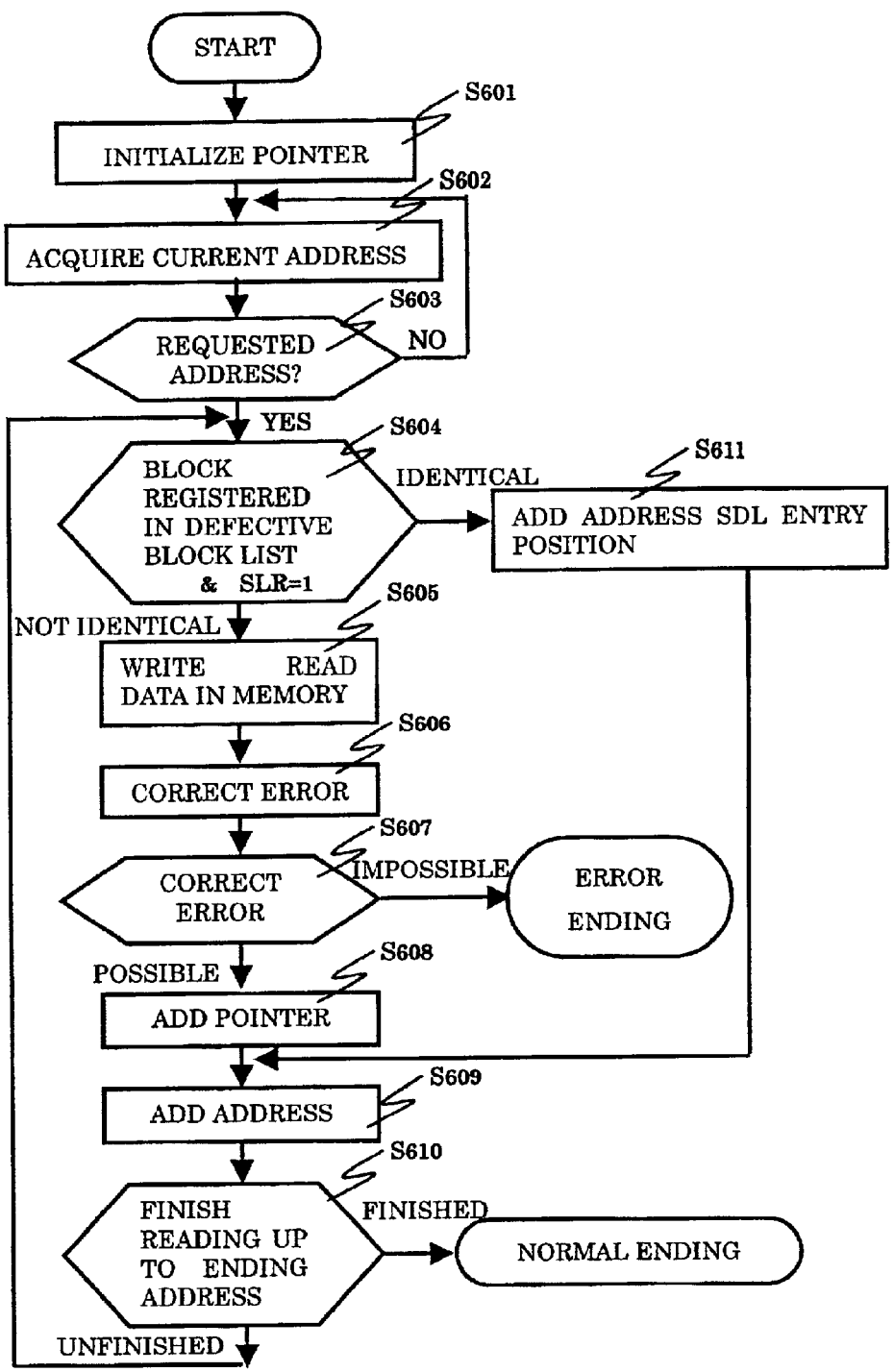
FIG. 6 is a flow chart showing the operation of the optical disk controller in Embodiment 1.

First, when receiving the read command issued by CPU 6 as mentioned above, the optical disk controller 5 initializes the pointer with the value specified in the "buffer page address" field of the read command (FIG. 6, Step S601). The value specified in the "buffer page address" field indicates the position on the memory 4 where the data read out from the recording medium 1 is written.

Then, the optical disk controller 5 watches the address of the recording medium 1 (FIG. 6, Step S602), reads out data from a value (that is, the read-starting address) specified in the "the head address" field of the read command, and starts writing on the memory 4.

Then, the optical disk controller 5 also processes the defective block as will be explained below.

That is, the optical disk controller 5 checks the entry position specified in the "SDL point" field of the defective block list setting command issued by CPU 6 (that is, the address of the defective block registered in defective block list) against the address of the block to be read (FIG. 6, Step S604).

If the two checked addresses are not identical, the optical disk controller 5 writes data from the recording medium 1 on the memory 4 and makes an error correction on the written data (FIG. 6, Steps S605→S606). The error correction is a technique of automatically detecting and correcting an error of data. Such a technique is already known and will not be explained here.

If an error correction can not be made (FIG. 6, Step S607: impossible), the optical disk controller 5 makes error ending, and notifies the error ending status to CPU 6. This error ending status is judged by CPU 6 at S507 in FIG. 5 as mentioned above.

If, on the other hand, an error correction is made (FIG. 6, Step S607: possible), the pointer and the address for the next block to be buffered at the next position on the memory 4 are added (FIG. 6, Steps S609→S609), and then it is judged whether all data of the length specified by CPU 6 have been read (FIG. 6, Step S610).

If all the data have not been read (FIG. 6, Step S610: not finished), the process returns to S604, and the entry position and the address after the above-mentioned addition are checked.

If, on the other hand, all the data have been read (FIG. 6, Step S610: finished), the optical disk controller 5 makes normal ending and informs CPU 6 of the normal ending status. The normal ending status is judged by CPU 6 at S507 shown in FIG. 5.

If the two addresses checked at S604 are found to be identical, the optical disk controller 5 further checks the SLR flag of the defective block. And if this SLR flag is "0," the block is an ordinary defective block. Therefore, the optical disk controller 5 informs CPU 6 of the status of the defective block detection error and ends the reading. CPU 6, which receives the status of the defective block detection error, acquires from the defective block list the address of an alternative block corresponding to the defective block. For this alternative block, CPU 6 issues a read command to the optical disk controller 5.

If, on the other hand, the SLR flag is "1," the block is an RTR defective block. Therefore, the optical disk controller 5 advances the entry position by one (FIG. 6, Step S611) and does not read this defective block but adds an address to read the next block (FIG. 6, Step S609).

In the present embodiment, as set forth above, if the block to be read from the recording medium 1 is an RTR defective block, this defective block is not read but the next block is read out. That permits reproducing data of the RTR type uninterruptedly without affecting real time reproduction. Also, the system is so arranged that in case an ordinary defective block has to be read out, its alternative block will be read out. As in the prior art, therefore, ordinary data also can be reproduced precisely.

In the above description, the system is so arranged that after the entry position is added at S611, the address is added at S609. Therefore, the RTR defective block is not written on the memory 4, but the next block that could be read correctly is written at the position of the memory 4 for the defective block to be written. But the present invention is not limited thereto.

That is, since it is necessary to leave the data already written at this position, the entry position is added at S611. Then, after the pointer is added at S608, the address may be added at S609.

Alternatively, it may be so arranged that after this position is filled with NULL data, the pointer is added at S608 and then the address is added at S609. Needless to say, it may be so configured that the block just before the defective block is copied instead of filling with NULL data.

It is also noted that in the above description, in order to reproduce ordinary data precisely, in case an ordinary defective block has to be read out, the alternative block corresponding to the defective block is read out. But the present invention is not limited thereto. That is, it may be so arranged that CPU 6 instructs the optical disk controller 5 not to read an alternative block (but an ordinary defective block) as by using the "option" field of the read command.

Embodiment 2

In Embodiment 1, the system is so configured that the optical disk controller 5 processes defective blocks. As an alternative to that, it may be so configured that CPU 6 processes the defective blocks. Now, the configuration of the present embodiment will be explained with emphasis on the points different from those of Embodiment 1.

Figure 7:
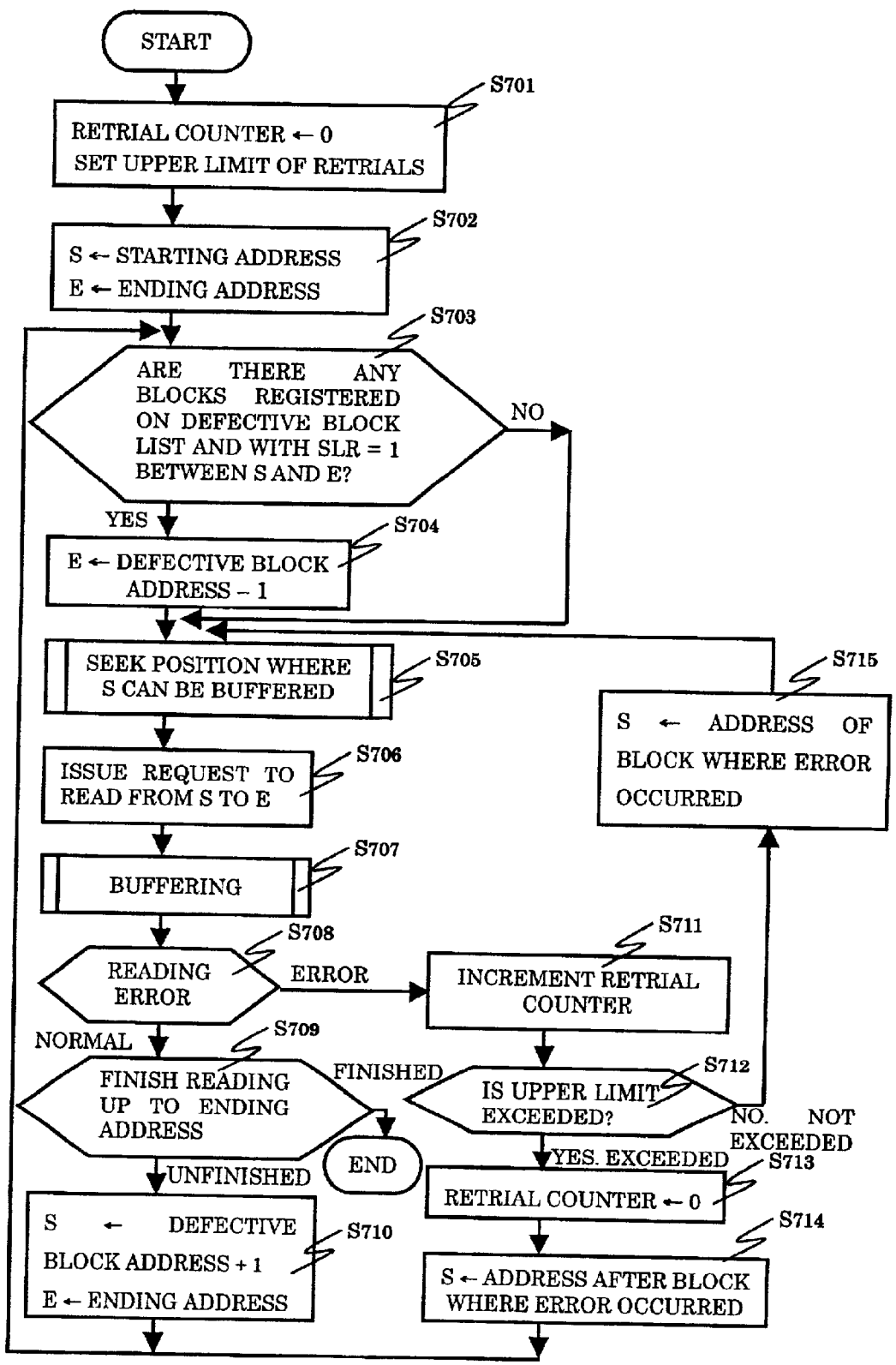
FIG. 7 is a flow chart showing the operation of CPU in Embodiment 2.

First, CPU 6 initializes the retrial counter (FIG. 7, Step S701), substitutes the read-starting address for the variable S and substitutes the final read-ending address for the variable E (FIG. 7, Step S702).

Then, CPU 6 judges whether a defective block with the SLR flag being "1" is present between the address on the recording medium 1 represented by the variable S and the address on the recording medium 1 represented by the variable E on the basis of the contents of the defective block list that has been acquired from the recording medium 1 (FIG. 7, Step S703).

If no defective block with the SLR flag being "1" is not present, CPU 6 issues to the signal processing circuit 3 a direction to have the pickup 2 seek the address represented by the variable S on the recording medium 1 (FIG. 7, Step S705), and issues a read command to the optical disk controller 5 (FIG. 7, Step S706). Then, buffering (FIG. 7, Step S707) is performed by the optical disk controller 5. When the buffering is over, the ending status information is sent to CPU 6 (FIG. 7, Step S708).

Then, if the ending status information indicates normal ending, CPU 6 judges whether all the data of the length specified by the host computer 8 have been read. If all the data have been read, the host computer 8 ends the reading process (FIG. 7, Step S709: finished). If, on the other hand, the ending status information indicates error ending, CPU 6 increments the retrial counter and judges whether the retrial counter has exceeded the predetermined upper limit of retrials (FIG. 7, Steps S711→S712).

If the retrial counter has not exceeded the upper limit of retrials, CPU 6 issues to the optical disk controller 5 a direction to retry reading the block that had a reading error (FIG. 7, Steps S715→S705→S706→S707→S708). If, on the other hand, the retrial counter has exceeded the upper limit, CPU 6 gives up reading the block that had a reading error and issues to the optical disk controller 5 a direction to read the next block (FIG. 7, Steps S713→S714→S703→S704→S705→S706→S707→S708).

Judging at S703 that a defective block with the SLR flag being "1" is present between the address on the recording medium 1 represented by the variable S and the address on the recording medium 1 represented by the variable E, CPU 6 performs the following defective block processing.

If, for example, the address of the defective block is address A, CPU 6 issues to the optical disk controller 5 a read command to read from address S to address A−1 (just before the defective block). And in the next read command, CPU 6 specifies a reading scope from address A+1 (just after the defective block) to address E.

That is, before issuing a read command to the optical disk controller 5, CPU 6 specifies the earliest address A between address S and address E out of the addresses of defective blocks registered on the defective block list and substitutes the value A−1 just before that for the variable E (FIG. 7, Step S704). And the process is advanced from S705 to S708. When buffering from address S to address A−1 is finished, CPU 6 clears the retrial counter with 0, and substitutes address A+1 (just after the defective block) for the variable S and substitutes the intrinsically final read-ending address for the variable E (FIG. 7, Step S710). After that, CPU 6 issues a read command to the optical disk controller 5 (FIG. 7, Steps S713→S714→S703→S704→S705→S706→S707→S708).

As set forth above, the present embodiment produces the same results as Embodiment 1. In other words, in case a block to be read from the recording medium 1 is an RTR defective block, it is possible to read out not this defective block but the next block.

Embodiment 3

The operation of CPU 6 is the same as that in Embodiment 1 and will not be explained. The operation of the optical disk controller 5 will be explained with emphasis on the points different from those in Embodiment 1 or 2.

Figure 8:
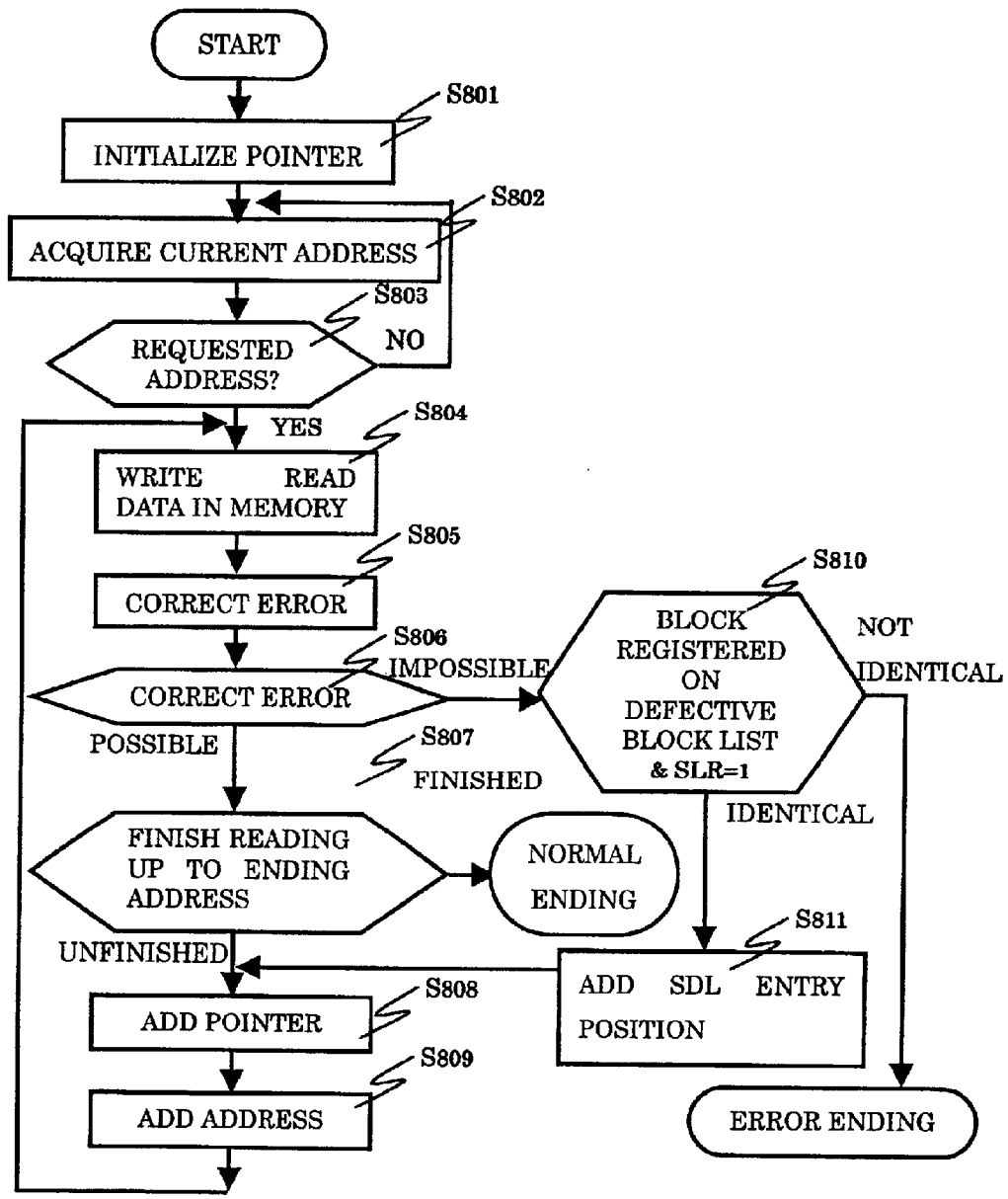
FIG. 8 is a flow chart showing the operation of the optical disk controller in Embodiment 3.

First, receiving a read command issued by CPU 6 as mentioned above, the optical disk controller 5 initializes the pointer with a value specified in the "buffer page address" field of the read command (FIG. 8, Step S801). The value specified in the "buffer page address" field of the read command indicates the position on the memory 4 where data read out from the recording medium 1 are written as mentioned above.

Then, the optical disk controller 5 watches the addresses on the recording medium 1 (FIG. 8, Step S802), and reads data starting with the value (that is, the read-starting address) specified in the "the head address" field of the read command, starting writing on the memory 4.

Here, the optical disk controller 5 reads out data from the recording medium 1 and writes on the memory 4 and makes an error correction on the written data (FIG. 8, Steps S804→S805). And when the error correction is made, the optical disk controller 5 judges whether all the data of the length specified by CPU 6 have been read (FIG. 8, Step S807). If it is judged that all the data have been read, the optical disk controller 5 ends the process normally and informs CPU 6 of the normal ending status. The normal ending is judged by CPU 6 at S507 as shown in FIG. 5.

If, on the other hand, all the data have not been read, the pointer and the address for the next block to be buffered at the next position on the memory 4 are added, and then the reading of data from the recording medium 1 is repeated (FIG. 8, Steps S808→S809→S804→S805→S806).

Here, if the error correction could not be made at S805, the optical disk controller 5 processes the defective block in the following way.

That is, the optical disk controller 5 checks the address of the block where an error occurred against the address of the defective block registered in the defective block list (FIG. 8, Steps S810). In case the two addresses are not identical, the process is ended with an error, and the error ending status is notified to CPU 6. This error ending status is judged by CPU 6 at S507 in FIG. 5 as mentioned above.

If, on the other hand, the two checked addresses are found to be identical, the SLR flag of the defective block is further checked. If the SLR flag is "1," the block where the error occurred is an RTR defective block, and the optical disk controller 5 does not make an error ending even if this block can not be read precisely because the error could not be corrected. That is, the SDL entry position is advanced to the next, and then the pointer and the address are added (FIG. 8, Steps S811→S808→S809). And the reading of data from the recording medium 1 is repeated (FIG. 8, Steps S804→S805→S806).

The present embodiment, as set forth above, is so configured that in case the block read out is an RTR defective block, even if the reading of the defective block is an error, the process proceeds to read the next block without suspending the process.

Embodiment 4

In Embodiment 3, the optical disk controller 5 processes a defective block. As an alternative to that, it may be so configured that CPU 6 does defective block processing. The configuration of the present embodiment will be explained with emphasis on the points different from those in Embodiment 1 or 2.

Figure 9:
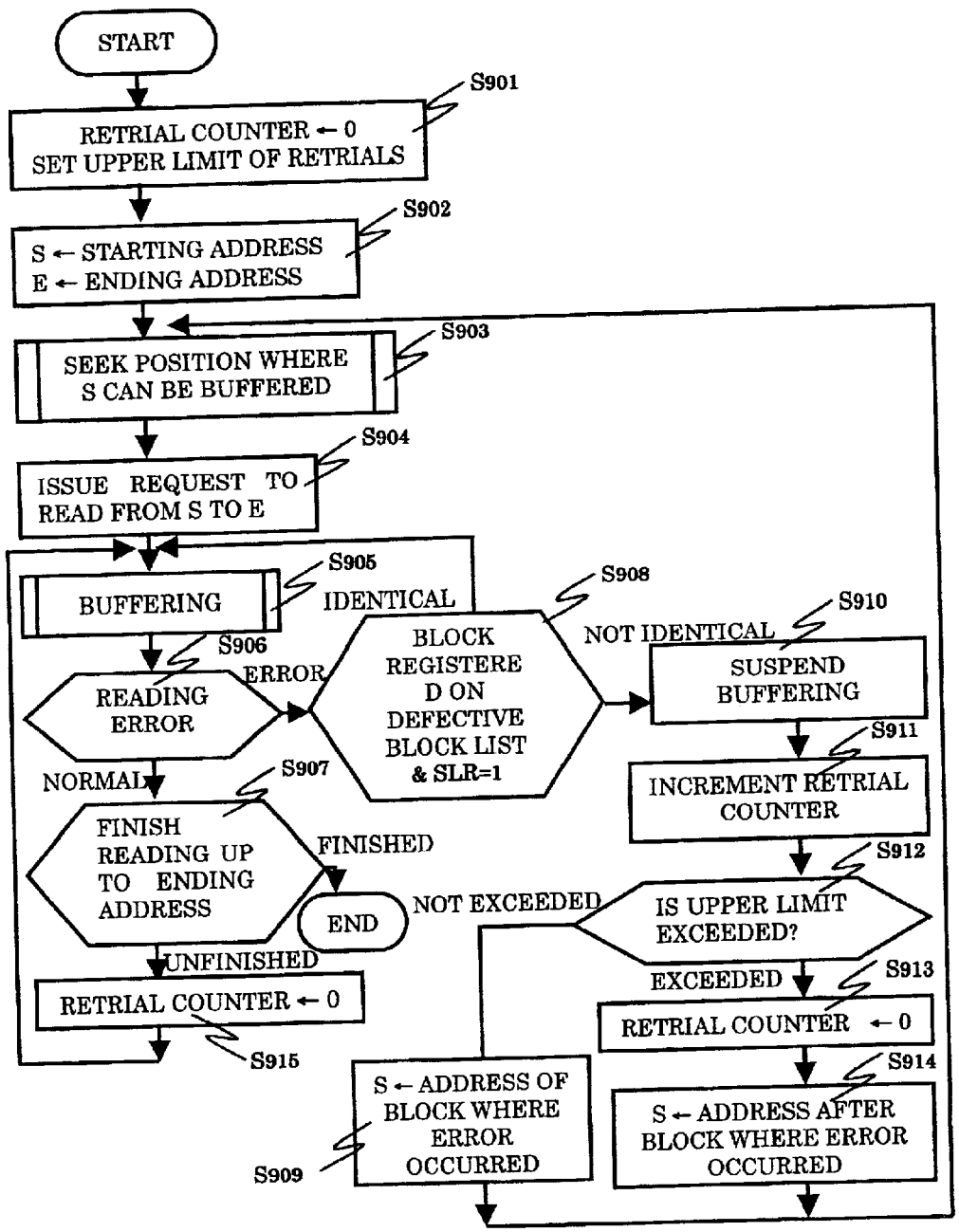
FIG. 9 is a flow chart showing the operation of CPU in Embodiment 4.

First, CPU 6 initializes the retrial counter (FIG. 9, Step S901), substitutes the read-starting address for the variable S and substitutes the final read-ending address for the variable E (FIG. 9, Step S902).

Then, CPU 6 gives to the signal processing circuit 3 a direction to have the pickup 2 seek the address on the recording medium 1 represented by the variable S (FIG. 9, Step S903), and issues a read command to the optical disk controller 5 (FIG. 9, Step S904). Then, buffering (FIG. 9, Step S905) is performed by the optical disk controller 5. When the buffering is over, the ending status information is sent to CPU 6.

That is, each time the buffering of one block is over, the optical disk controller 5 informs CPU 6 of the buffering state (whether the buffering of one block ended normally or ended with an error. After that, buffering is continued from the next address on the recording medium 1, whether the buffering state is normal or an error.

If the ending status information indicates normal ending, CPU 6 clears the retrial counter to 0, and continues to watch the buffering state until all the data, the reproduction of which was requested by the host computer 8, have been read (FIG. 9, Steps S905→S906→S907). If, on the other hand, the ending status information indicates error ending, the address of the block where an error occurred is checked against the address of the defective block registered on the defective block list (FIG. 9, Step S908).

Here, if the two checked addresses are not identical, CPU 6 directs the optical disk controller 5 to suspend buffering (FIG. 9, Step S910), increments the retrial counter (FIG. 9, Step S911) and judges if the retrial counter has exceeded the predetermined upper limit of retrials.

If the retrial counter has not exceeded the upper limit, CPU 6 issues to the optical disk controller 5 a read command to retry reading the block where the reading error occurred (FIG. 9, Steps S909→S903→S904→S905→S906). If, on the other hand, the retrial counter has exceeded the upper limit, CPU 6 gives up reading the block where the reading error occurred and issues to the optical disk controller 5 a read command to read the next block (FIG. 9, Steps S913→S914→S903→S904→S905→S906→S907→S908→S909).

If, on the other hand, the two checked addresses are found to be identical, the SLR flag of the defective block is further checked. If the SLR flag is "1," the block where the error occurred is an RTR defective block, and CPU 6 processes the defective block in the following way.

That is, even if the error can not be corrected and the defective block can not be read correctly, CPU 6 does not issue a direction to suspend buffering. In other words, the system is so configured that the optical disk controller 5 continues buffering (FIG. 9, Steps S905→S906).

As set forth above, the present embodiment, too, produces the same results as Embodiment 3. Namely, in case the block read out is an RTR defective block, even if the reading of the defective block is an error, it is possible to continue the process by reading the next block without interruption.

Embodiment 5

The configuration of the present embodiment will be explained with emphasis on the points different from those in Embodiment 1 or 2.

Figure 10:
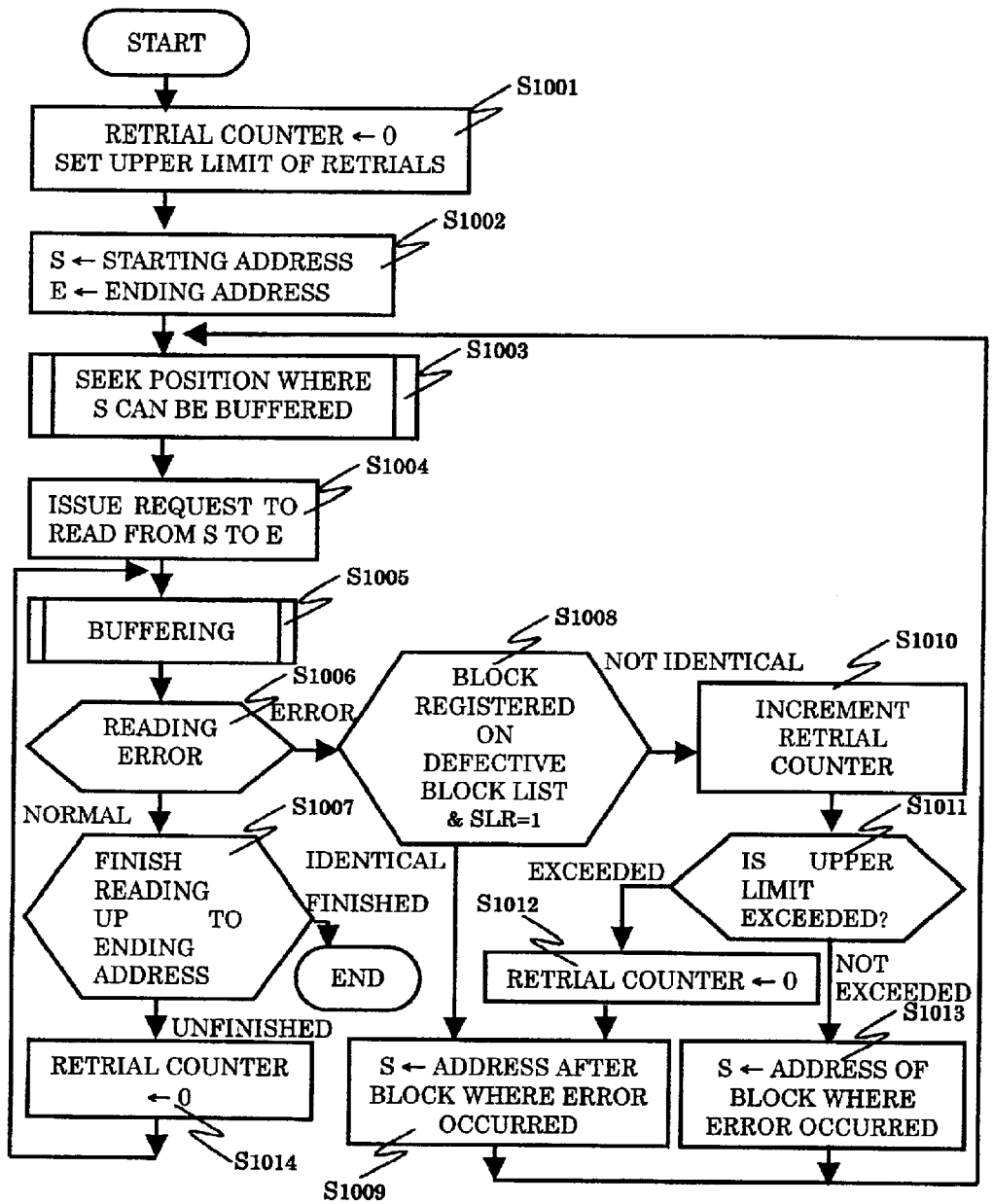
FIG. 10 is a flow chart showing the operation of CPU in Embodiment 5.

First, CPU 6 initializes the retrial counter (FIG. 10, Step S1001), substitutes the read-starting address for the variable S and substitutes the final read-ending address for the variable E (FIG. 10, Step S1002).

Next, CPU 6 issues to the signal processing circuit 3 a direction to have the pickup seek the address on the recording medium 1 represented by the variable S (FIG. 10, Step S1003), and issues a read command to the optical disk controller 5 (FIG. 10, Step S1004). Then, buffering (FIG. 10, Step S1005) is performed by the optical disk controller 5. When the buffering is over, the ending status information is sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

Then, if the ending status information indicates normal ending, CPU 6 clears the retrial counter to 0, and continues to watch the buffering state until all the data, the reproduction of which was requested by the host computer 8, have been read (FIG. 10, Steps S1005→S1006→S1007). If, on the other hand, the ending status information indicates error ending, the address of the block where an error occurred is checked against the address of the defective block registered on the defective block list (FIG. 10, Step S1008).

Here, if the two checked addresses are not identical, CPU 6 increments the retrial counter (FIG. 10, Step S1010), and judges if the retrial counter has exceeded the predetermined upper limit of retrials.

If the retrial counter has not exceeded the upper limit, CPU 6 issues to the optical disk controller 5 a read command to retry reading the block where the reading error occurred (FIG. 10, Steps S1013→S1003→S1004→S1005→S1006). If, on the other hand, the retrial counter has exceeded the upper limit, CPU 6 gives up reading the block where the reading error occurred and issues to the optical disk controller 5 a read command to read the next block (FIG. 10, Steps S1012→S1009→S1003→S1004→S1005→S1006→S1007→S1008→S1009).

If, on the other hand, the two checked addresses are found to be identical, the SLR flag of the defective block is further checked. If the SLR flag is "1," the block where the error occurred is an RTR defective block, and CPU 6 processes the defective block in the following way.

That is, even if the error can not be corrected on the defective block, CPU 6 regards the buffered data as valid and does not retry reading. In other words, the system is so configured that CPU 6 issues to the optical disk controller 5 a read command to continue buffering from the address just after the defective block on the recording medium 1, that is, at the position next to the one where the defective block is buffered (FIG. 10, Steps S1009→S1003→S1004→S1005→S1006).

The present embodiment, as set forth above, is so configured that in case a block read out is an RTR defective block, the next block will be read out without retrying reading the defective block.

Embodiment 6

The configuration of the present embodiment will be explained with emphasis on the points different from those in Embodiment 1 or 2.

Figure 11:
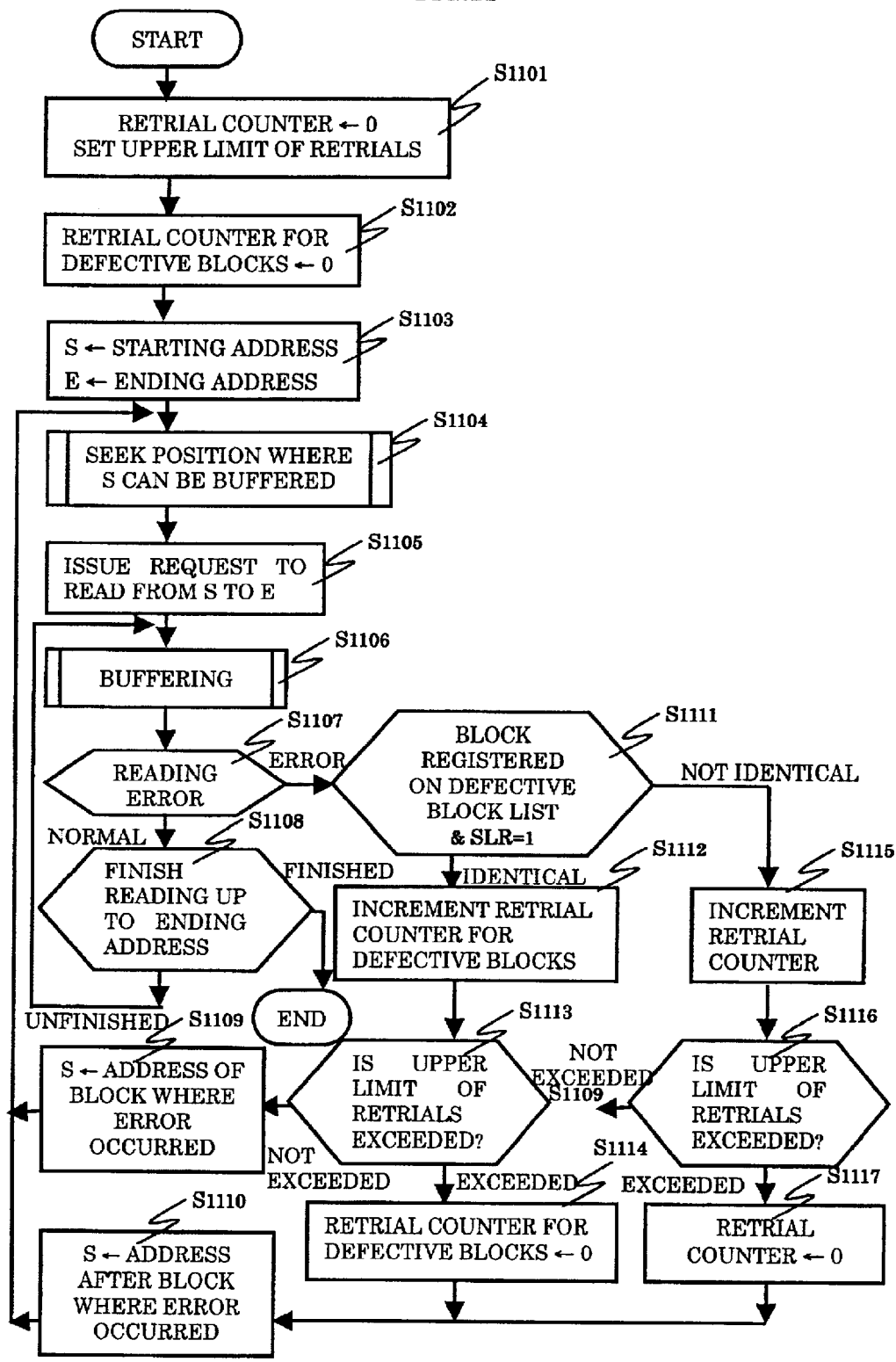
FIG. 11 is a flow chart showing the operation of CPU in Embodiment 6.

First, CPU 6 initializes the retrial counter (FIG. 11, Step S1101), and initializes a retrial counter for defective blocks (FIG. 11, Step S1102), and then substitutes the read-starting address for the variable S and substitutes the final read-ending address for the variable E (FIG. 11, Step S1103). The retrial counter for defective blocks is a retrial counter for use in detecting defective blocks as will be described later.

In the next step, CPU 6 gives to the signal processing circuit 3 a direction to have the pickup 2 seek the address on the recording medium 1 represented by the variable S (FIG. 11, Step S1104), and issues a read command to the optical disk controller 5 (FIG. 11, Step S1105). Then, buffering (FIG. 11, Step S1106) is performed by the optical disk controller 5. When the buffering is over, the ending status information is sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

Then, if the ending status information indicates normal ending, CPU 6 clears the retrial counter to 0, and continues to watch the buffering state until all the data, the reproduction of which was requested by the host computer 8, have been read (FIG. 11, Steps S1006→S1007→S1008). If, on the other hand, the ending status information indicates error ending, the address of the block where an error occurred is checked against the address of the defective block registered on the defective block list (FIG. 11, Step S111).

Here, if the two checked addresses are not identical, CPU 6 increments the retrial counter (FIG. 11, Step S1115), and judges if the retrial counter has exceeded the predetermined upper limit of retrials.

If the retrial counter has not exceeded the upper limit, CPU 6 issues to the optical disk controller 5 a read command to retry reading the block where the reading error occurred (FIG. 11, Steps S1109→S1104→S1105→S1106→S1107). If, on the other hand, the retrial counter has exceeded the upper limit, CPU 6 gives up reading the block where the reading error occurred and issues to the optical disk controller 5 a read command to read the next block (FIG. 11, Steps S1117→S1110→S1104→S1105→S1106→S1107).

If, on the other hand, the two checked addresses are found to be identical, the SLR flag of the defective block is further checked. If the SLR flag is "1," the block where the error occurred is an RTR defective block, and CPU 6 processes the defective block in the following way.

That is, CPU 6 increments the retrial counter for defective blocks (FIG. 11, Step S1112), and judges if the retrial counter for defective blocks has exceeded the predetermined upper limit of retrials for a defective block (twice or three times, for example).

If the retrial counter has not exceeded the upper limit, CPU 6 issues to the optical disk controller 5 a read command to retry reading the block where the reading error occurred (FIG. 11, Steps S1109→S1104→S1105→S1106→S1107). If, on the other hand, the retrial counter has exceeded the upper limit, CPU 6 gives up reading the block where the reading error occurred and issues to the optical disk controller 5 a read command to read the next block (FIG. 11, Steps S1114→S1110→S1104→S1105→S1106→S1107).

The present embodiment, as set forth above, is so configured that in case the block read out is an RTR defective block, reading the defective block is retried a specific number of times.

In this example shown above, the system is so configured that there are separately provided the retrial counter for ordinary reading errors and the retrial counter for detecting defective blocks. As an alternative to that, a counter for common use may be provided.

Embodiment 7

The configuration of the present embodiment will be explained with emphasis on the points different from those in Embodiment 1 or 2.

Figure 12:
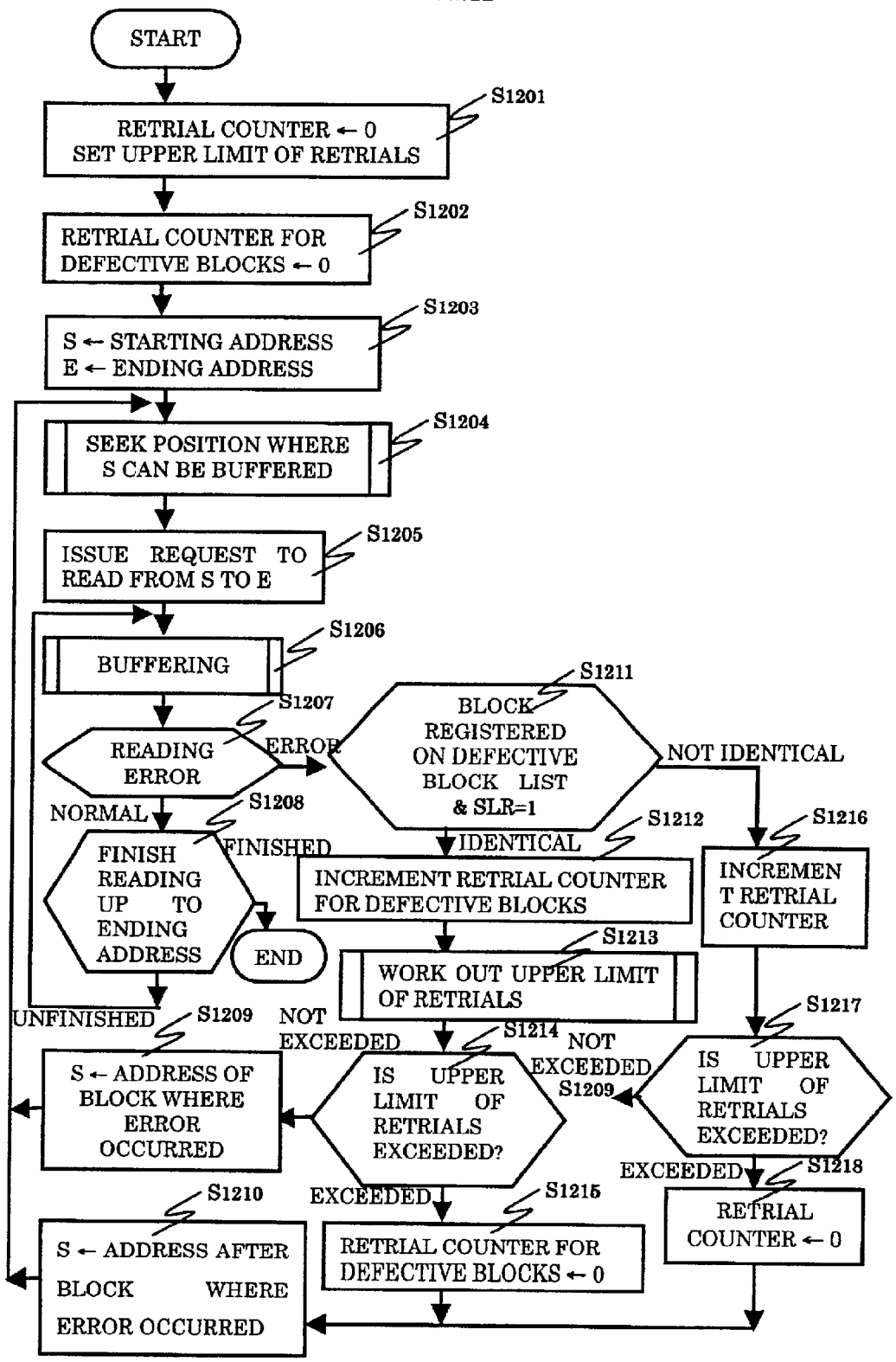
FIG. 12 is a flow chart showing the operation of CPU in Embodiment 7.

First, CPU 6 initializes the retrial counter (FIG. 12, Step S1201), and initializes the retrial counter for defective blocks (FIG. 12, Step S1202), and then substitutes the read-starting address for the variable S and substitutes the final read-ending address for the variable E (FIG. 12, Step S1203). The retrial counter for defective blocks is a retrial counter for use in detecting defective blocks as will be described later.

In the next step, CPU 6 gives to the signal processing circuit 3 a direction to have the pickup 2 seek the address on the recording medium 1 represented by the variable S (FIG. 12, Step S1204), and issues a read command to the optical disk controller 5 (FIG. 12, Step S1205). Then, buffering (FIG. 12, Step S1206) is performed by the optical disk controller 5. When the buffering is over, the ending status information is sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

If the ending status information indicates normal ending, CPU 6 clears the retrial counter to 0, and continues to watch the buffering state until all the data, the reproduction of which was requested by the host computer 8, have been read (FIG. 12, Steps S1206→S1207→S1208). If, on the other hand, the ending status information indicates error ending, the address of the block where an error occurred is checked against the address of the defective block registered on the defective block list (FIG. 12, Step S1211).

Here, if the two checked addresses are not identical, CPU 6 increments the retrial counter (FIG. 12, Step S1216), and judges if the retrial counter has exceeded the predetermined upper limit of retrials.

If the retrial counter has not exceeded the upper limit, CPU 6 issues to the optical disk controller 5 a read command to retry reading the block where the reading error occurred (FIG. 12, Steps S1209→S1204→S1205→S1206→S1207). If, on the other hand, the retrial counter has exceeded the upper limit, CPU 6 gives up reading the block where the reading error occurred and issues to the optical disk controller 5 a read command to read the next block (FIG. 12, Steps S1218→S1210→S1204→S1205→S1206→S1207).

If, on the other hand, the two checked addresses are found to be identical, the SLR flag of the defective block is further checked. If the SLR flag is "1," the block where the error occurred is an RTR defective block, and CPU 6 processes the defective block in the following way.

That is, CPU 6 increments the retrial counter for defective blocks (FIG. 12, Step S1212), and works out the upper limit of retrials for defective blocks by a method which will be described later (FIG. 12, Step S1213). Then, CPU 6 judges if the retrial counter for defective blocks has exceeded the upper limit of retrials for defective blocks—the upper limit thus worked out.

If the retrial counter for defective blocks has not exceeded the upper limit of retrials for defective blocks, CPU 6 issues to the optical disk controller 5 a read command to retry reading the defective block (FIG. 12, Steps S1209→S1204→S1205→S1206→S1207). If, on the other hand, the retrial counter for defective blocks has exceeded the upper limit of retrials for defective blocks, CPU 6 gives up reading the defective block and issues to the optical disk controller 5 a read command to read the next block (FIG. 12, Steps S1215→S1210→S1204→S1205→S1206→S1207).

The method of working out the upper limit of retrials for defective blocks will be explained.

First, considering the buffering state on the memory 4, CPU 6 specifies the number of pre-read blocks and the number of blocks to be pre-read, and finds the number of defective blocks present between the address of the defective block and the blocks to be pre-read on the basis of the defective block list. And CPU 6 works out the number of reading retrials per defective block—the number of reading retrials being such that the time needed to forward the reproducing blocks to the host computer 8 is not exceeded, and issues to the optical disk controller 5 a direction to retry reading a maximum of that number of times.

Figure 3:
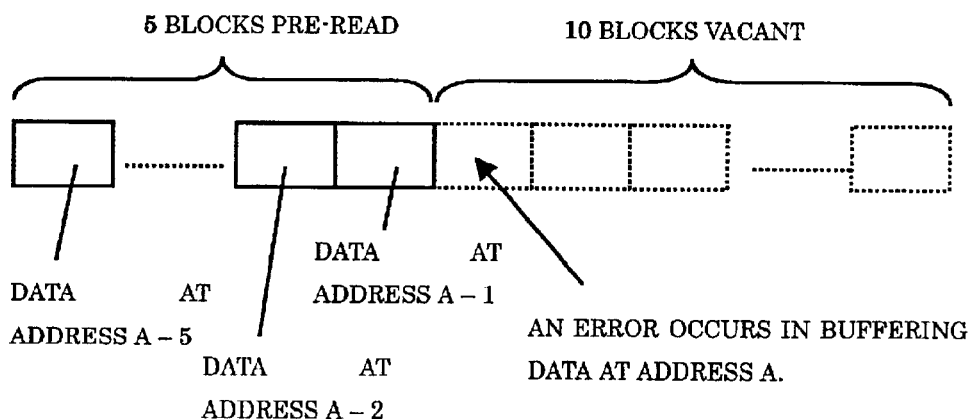
FIG. 3 shows a buffering state when a reading error occurs and an example of the defective block list.

Let it be supposed that it takes 24 msec. to forward one block and 20 msec. to retry reading every time. When the optical disk controller 5 informs CPU 6 of a reading error, the number of pre-read blocks is 5 as shown in FIG. 3(*a*) and the number of blocks to be pre-read (number of vacant sections) is 10.

Then, the time required to forward the pre-read blocks to the host computer 8—the time to be consumed until data have gone out of the memory 4—is 5×24=120 msec. The number of retrials that can be made within that time is 120 msec.÷20 msec.=6. Therefore, in case the number of defective blocks present between address A of the defective block and the blocks to be pre-read is 2, the largest possible number of retrials per defective block is 6÷2=3.

The present embodiment, as set forth above, is so configured that the largest possible number of retrials per defective block is worked out on the basis of the number of pre-read blocks, the number of blocks to be pre-read and the number of defective blocks present among the blocks to be pre-read and reading an RTR defective block is retried a maximum of that number of times.

In this connection, there may be provided a learning function that if the memory 4 becomes empty when reading is retried the number of times worked out as explained above, the upper limit of retrials of reading a defective block is reduced from next time on.

Embodiment 8

The way of working out the upper limit of defective block reading retrials is not limited to the method described in Embodiment 7. The configuration of the present embodiment will be explained with emphasis on the points different from those in Embodiment 7.

First, let it be supposed that it takes 14 msec. to forward one block and 20 msec. to retry reading a block every time. The number of pre-read blocks is 5 as shown in FIG. 3(*a*) and the number of blocks to be pre-read is 10. As explained above, the largest possible number of reading retrials within the time required to forward the pre-read blocks to the host computer 8 is 120 (5×24) msec.=6.

In Embodiment 7, it is presupposed that there are two defective blocks between address A of the defective block and the blocks to be pre-read is 2. In this case, reading can be retried 3 times (6÷2=3). But if the number of defective blocks is 7, the largest possible number of reading retrials is less than 1 time because 6÷7=0.857 . . . How such a case should be handled is a problem.

In the present embodiment, reading data will be not retried if the largest possible number of retrials calculated as above is less than 1. That solves the problem that the memory 4 becomes empty of data and there arises a waiting time in forwarding data to the host computer 8.

But it goes without saying that even if the number of reading retrials calculated as above is less than 1, reading may be retried in case where data forwarding to the host computer 8 can be interrupted.

Embodiment 9

The configuration of the present embodiment will be explained with emphasis on the points different from those in Embodiment 1 or 2.

Figure 13:
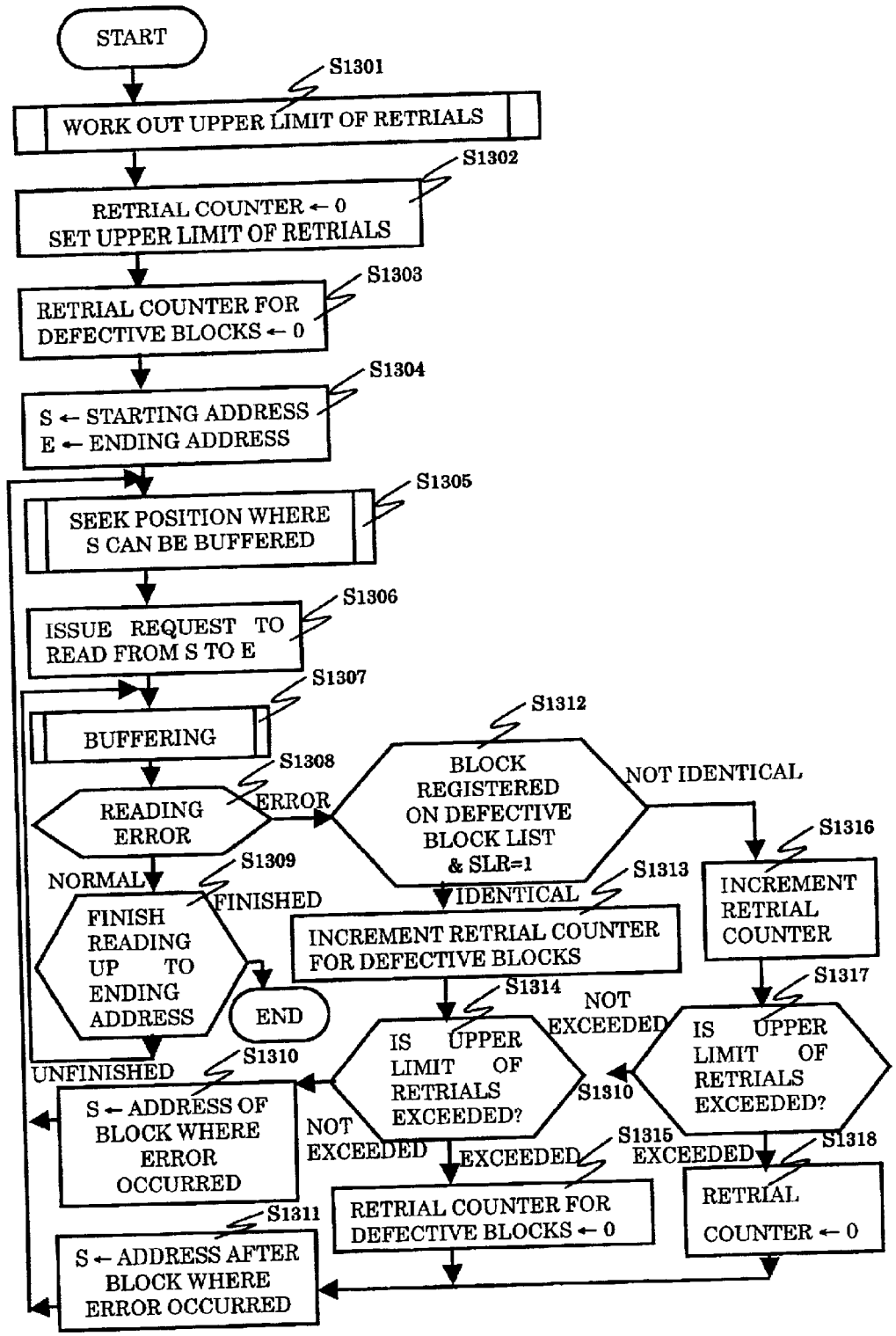
FIG. 13 is a flow chart showing the operation of CPU in Embodiment 9.

First, CPU 6 works out the upper limit of the number of defective block reading retrials in a method that will be described later (FIG. 13, Step S1301). Then, CPU 6 initializes the retrial counter (FIG. 13, Step S1302), and initializes the retrial counter for defective blocks (FIG. 13, Step S1303), and then substitutes the read-starting address for the variable S and substitutes the final read-ending address for the variable E (FIG. 13, Step S1304). The retrial counter for defective blocks is a retrial counter for use in detecting defective blocks as will be described later.

In the next step, CPU 6 gives to the signal processing circuit 3 a direction to have the pickup 2 seek the address on the recording medium 1 represented by the variable S (FIG. 13, Step S1305), and issues a read command to the optical disk controller 5 (FIG. 13, Step S1306). Then, buffering (FIG. 13, Step S1307) is performed by the optical disk controller 5. When the buffering is over, the ending status information is sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

If the ending status information indicates normal ending, CPU 6 clears the retrial counter to 0, and continues to watch the buffering state until all the data, the reproduction of which was requested by the host computer 8, have been read (FIG. 13, Steps S1307→S1308→S1309). If, on the other hand, the ending status information indicates error ending, the address of the block where an error occurred is checked against the address of the defective block registered on the defective block list (FIG. 13, Step S1312).

Here, if the two checked addresses are not identical, CPU 6 increments the retrial counter (FIG. 13, Step S1316), and judges if the retrial counter has exceeded the predetermined upper limit of retrials.

If the retrial counter has not exceeded the upper limit of retrials, CPU 6 issues to the optical disk controller 5 a read command to retry reading the block where the reading error occurred (FIG. 13, Steps S1310→S1305→S1306→S1307→S1308). If, on the other hand, the retrial counter has exceeded the upper limit of retrials, CPU 6 gives up reading the block where the reading error occurred and issues to the optical disk controller 5 a read command to read the next block (FIG. 13, Steps S1318→S1311→S1305→S1306→S1307→S1308).

If, on the other hand, the two checked addresses are found to be identical, the SLR flag of the defective block is further checked. If the SLR flag is "1," the block where the error occurred is an RTR defective block, and CPU 6 processes the defective block in the following way.

That is, CPU 6 increments the retrial counter for defective blocks (FIG. 13, Step S1313), and judges if the retrial counter for defective blocks has exceeded the upper limit of defective block reading retrials calculated at S1301.

If the retrial counter for defective blocks has not exceeded the upper limit of defective block reading retrials, CPU 6 issues to the optical disk controller 5 a read command to retry reading the defective block (FIG. 13, Steps S1310→S1305→S1306→S1307→S1308). If, on the other hand, the retrial counter for defective blocks has exceeded the upper limit of defective block reading retrials, CPU 6 gives up reading the defective block and issues to the optical disk controller 5 a read command to read the next block (FIG. 13, Steps S1315→S1311→S1305→S1306→S1307→S1308).

The method of working out the upper limit of retrials for defective blocks will be explained.

Let it be supposed that the number of pre-read blocks is 100 and the number of defective blocks registered in the defective block list is 20. That means that there is one defective block in every five blocks (that is, the ratio of defective block to pre-read blocks is 1:4). Therefore, it takes 24 msec. to forward one block and 20 msec. to make a reading retrial. In this case, (4×24)÷20 =4.8. That is, one defective block can be retried four times.

In the present embodiment, the system is so configured that, as set forth above, the number of possible reading retrials per defective block is worked out on the basis of the distribution ratio of defective blocks, the speed at which a block is read out from the recording medium 1 and the speed at which a block is forwarded to the reproduction requester. Reading an RTR defective block is retried a maximum of that number of times.

In the present embodiment, the system is so arranged that the total number of defective blocks registered in the defective block list is used (that is, the distribution ratio of defective blocks over the whole of the recording medium 1 is worked out). But the present invention is not limited thereto. For example, it may be so configured that the recording medium 1 may be divided into two zones and that the distribution ratio may be worked out for every zone. It may also be so arranged that the distribution ratio is worked out within the scope of reproduction requested by the host computer 8.

In this connection, there may be provided a learning function that if the memory 4 becomes empty when reading is retried the number of times worked out as explained above, the upper limit of retrials of reading a defective block is reduced from next time on.

Embodiment 10

In Embodiments 1 to 9, a defective block list is used since it is necessary to distinguish RTR defective blocks from ordinary defective blocks in order to make it possible to reproduce data of the RTR type uninterruptedly and to reproduce ordinary data precisely.

However, in case the time comes when the host computer 8, which wants data to be reproduced uninterruptedly, will be able to specify to that effect by a parameter of the reproduction request (RTR standards are expected to be established) as shown in FIG. 14, there will be no need to use the defective block list as in Embodiments 1 to 9. Embodiments 10 to 13, which will be explained, can achieve the same effect as Embodiments 3 to 6, whether a defective block list is available or not. But without a defective block list, it is impossible to read out an alternative block for a defective block or to distinguish between an ordinary defective block and an RTR defective block.

The configuration of the present embodiment will be explained with emphasis on the points different from those in Embodiment 1 or 2.

Figure 15:
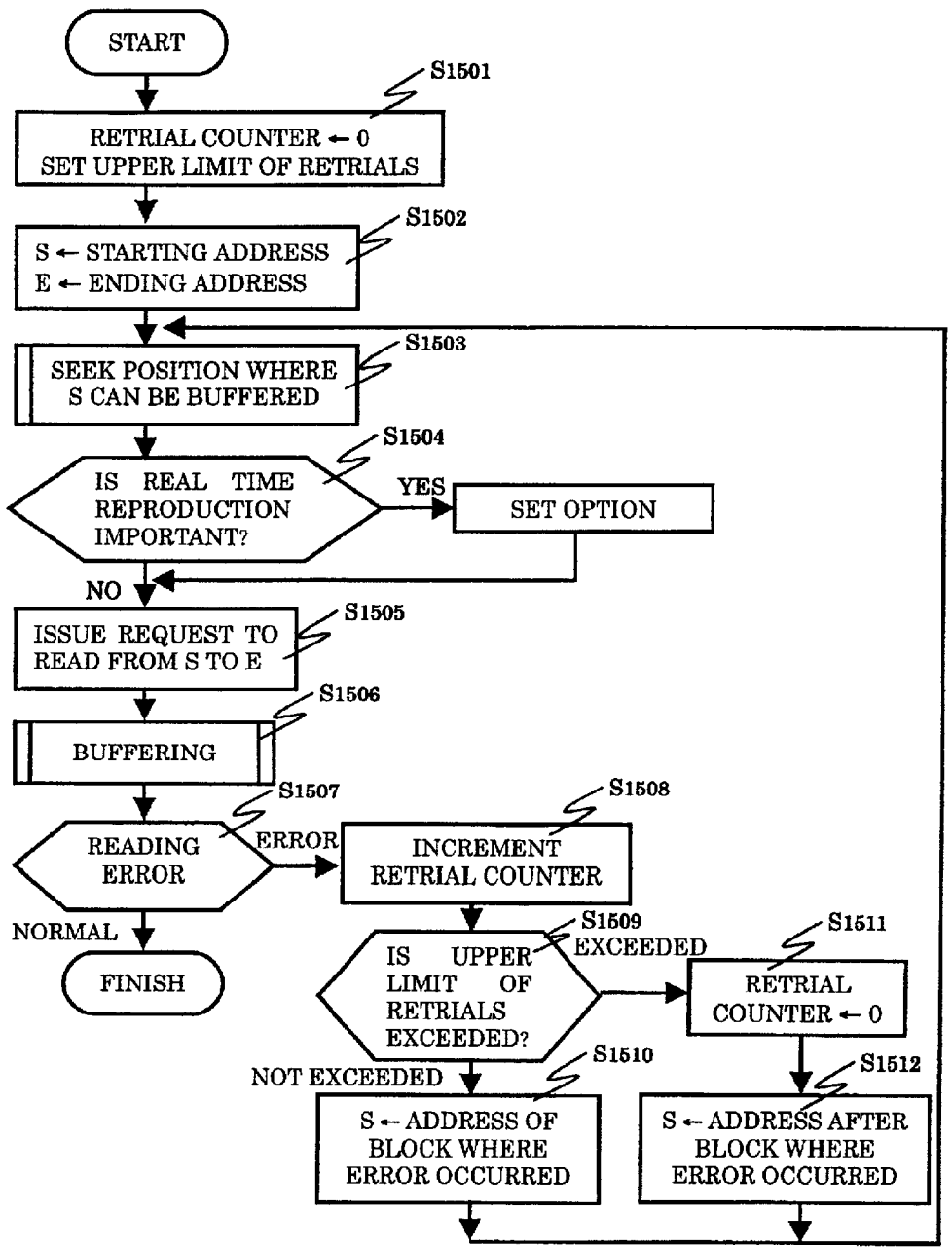
FIG. 15 is a flow chart showing the operation of CPU in Embodiment 10.

First, CPU 6 initializes the retrial counter (FIG. 15, Step S1501), and then substitutes the read-starting address for the variable S and substitutes the final read-ending address for the variable E (FIG. 15, Step S1502).

In the next step, CPU 6 gives to the signal processing circuit 3 a direction to have the pickup 2 seek the address on the recording medium 1 represented by the variable S (FIG. 15, Step S1504), and issues a read command to the optical disk controller 5 (FIG. 15, Step S1505).

Here, in case an indication that "real time reproduction is important" is given by the parameter of the reproduction request issued by the host computer 8, CPU 6 specifies an indication that "real time reproduction is important" by the parameter in the read command. The way of specifying an indication that "real time reproduction is important" is not limited in particular. For example, another command to the effect that an indication that "real time reproduction is important" is given may be issued to the optical disk controller 5.

Then, buffering (FIG. 15, Step S1506) is performed by the optical disk controller 5. When the buffering is over, the ending status information is sent to CPU 6.

Then in case the ending status information indicates normal ending, CPU 6 ends the reading process (FIG. 15, Step S1507). If, on the other hand, the ending status means error ending, CPU 6 increments the retrial counter and judges if the retrial counter has exceeded the predetermined upper limit of retrials (FIG. 15, Steps S1508→S1509).

And if the retrial counter has not exceeded the upper limit of retrials, CPU 6 issues to the optical disk controller 5 a read command to retry reading the block where the reading error occurred (FIG. 15, Steps S1510→S1504→S1505→S1506→S1507). If, on the other hand, the retrial counter has exceeded the upper limit, CPU 6 gives up reading the block where the reading error occurred and issues to the optical disk controller 5 a read command to read the next block (FIG. 15, Steps S1511→S1512→S1504→S1505→S1505→S1507).

The operation of the optical disk controller 5 will be explained with reference to FIG. 16.

Figure 16:
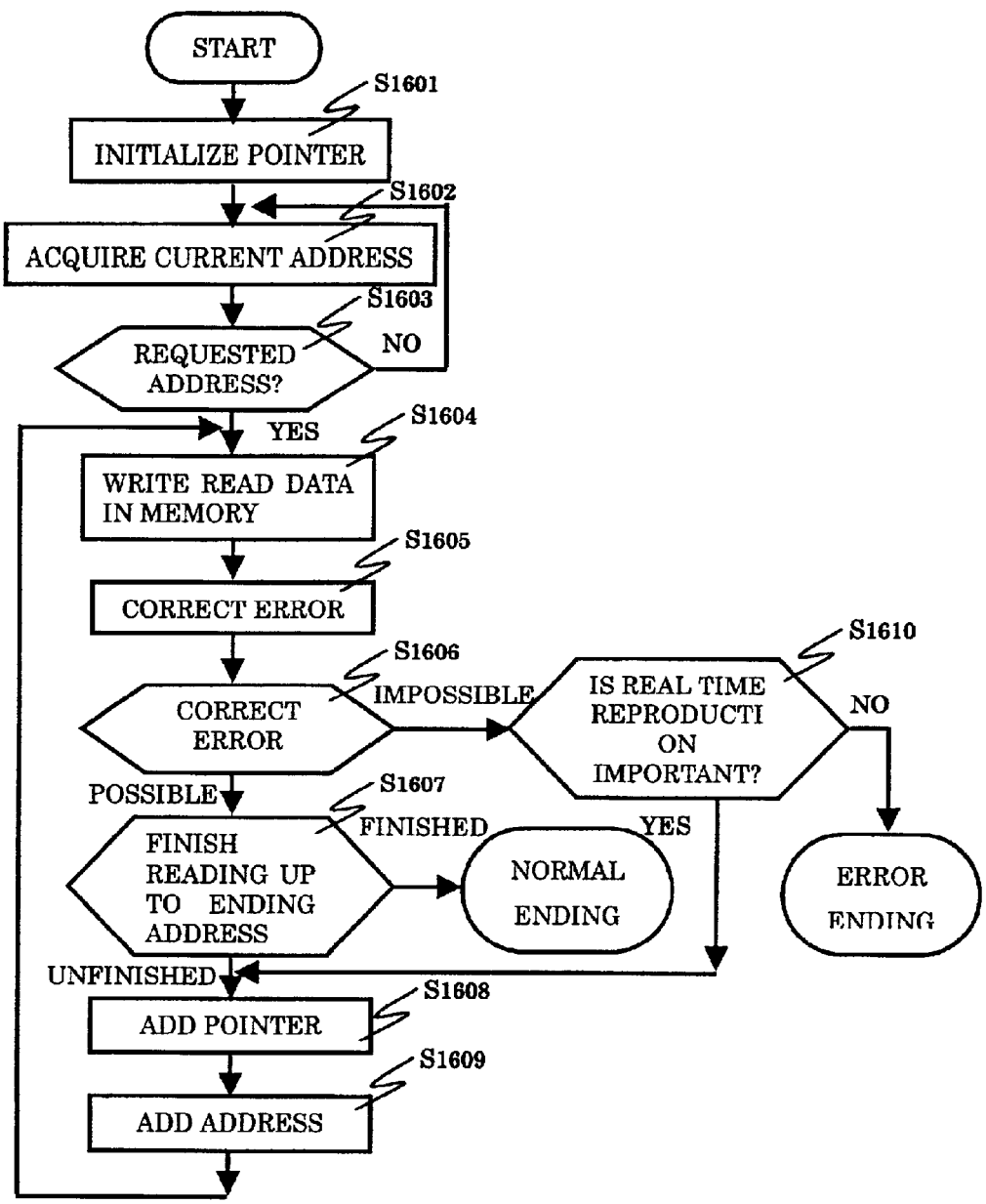
FIG. 16 is a flow chart showing the operation of the optical disk controller in Embodiment 10.

First, receiving the read command issued by CPU 6, the optical disk controller 5 initializes the pointer with a value specified in the "buffer page address" field of this lead command (FIG. 16, Step S1601). The value specified in the "buffer page address" field of this lead command indicates a position on the memory 4 where data read out from the recording medium 1 is written.

Then, the optical disk controller 5 watches the address on the recording medium 1 (FIG. 16, Step S1602), and reads out data from the value (that is, the read-starting address) specified in the "the head address" field of the read command and begins to write data on the memory 4.

Here, the optical disk controller 5 reads out data from the recording medium 1, writes on the memory 4 and corrects the error in the written data (FIG. 16, Steps S1604→S1605). And when error correction is made, the optical disk controller 5 judges whether all the data of the length specified by CPU 6 have been read (FIG. 16, Step S1607). If it is judged that all the data have been read, the optical disk controller 5 ends the process normally and informs CPU 6 of normal ending status.

The normal ending status is judged by CPU 6 at S1507 in FIG. 15 as mentioned above.

If, on the other hand, all the data have not been read yet, the pointer and the address for the next block to be buffered at the next position on the memory 4 are added, and then the reading of data from the recording medium 1 is repeated (FIG. 16, Steps S1608→S1609→S1604→S1605→S1606).

Here, if the error correction can not be made at S1605, the optical disk controller 5 processes the defective block in the following way.

That is, the optical disk controller 5 judges whether an indication that "real time reproduction is important" is given by the parameter of the read command issued by CPU 6 as mentioned above. If an indication that "real time reproduction is important" is not given, the optical disk controller 5 makes error ending and notified error ending status to CPU 6. The error ending status is judged by CPU 6 at S1507 in FIG. 15 as mentioned above.

If, on the other hand, an indication that "real time reproduction is important" is given by the parameter of the read command issued by CPU 6, the optical disk controller 5 adds the address (FIG. 16, Step S1608) and repeats reading data from the recording medium 1 (FIG. 16, Steps S1604→S1605→S1606→S1607→S1608→S1609).

The present embodiment, as set forth above, is so configured that in case an indication that "real time reproduction is important" is given by the parameter of the reproduction request issued by the host computer 8, even if the reading of the defective block is an error, the process proceeds to read the next block without interruption.

Embodiment 11

In Embodiment 10, the optical disk controller 5 processes a defective block. Alternatively, it may be configured that CPU 6 does that defective block processing. The configuration of the present embodiment will be explained with emphasis on the points different from those in Embodiment 1 or 2.

Figure 17:
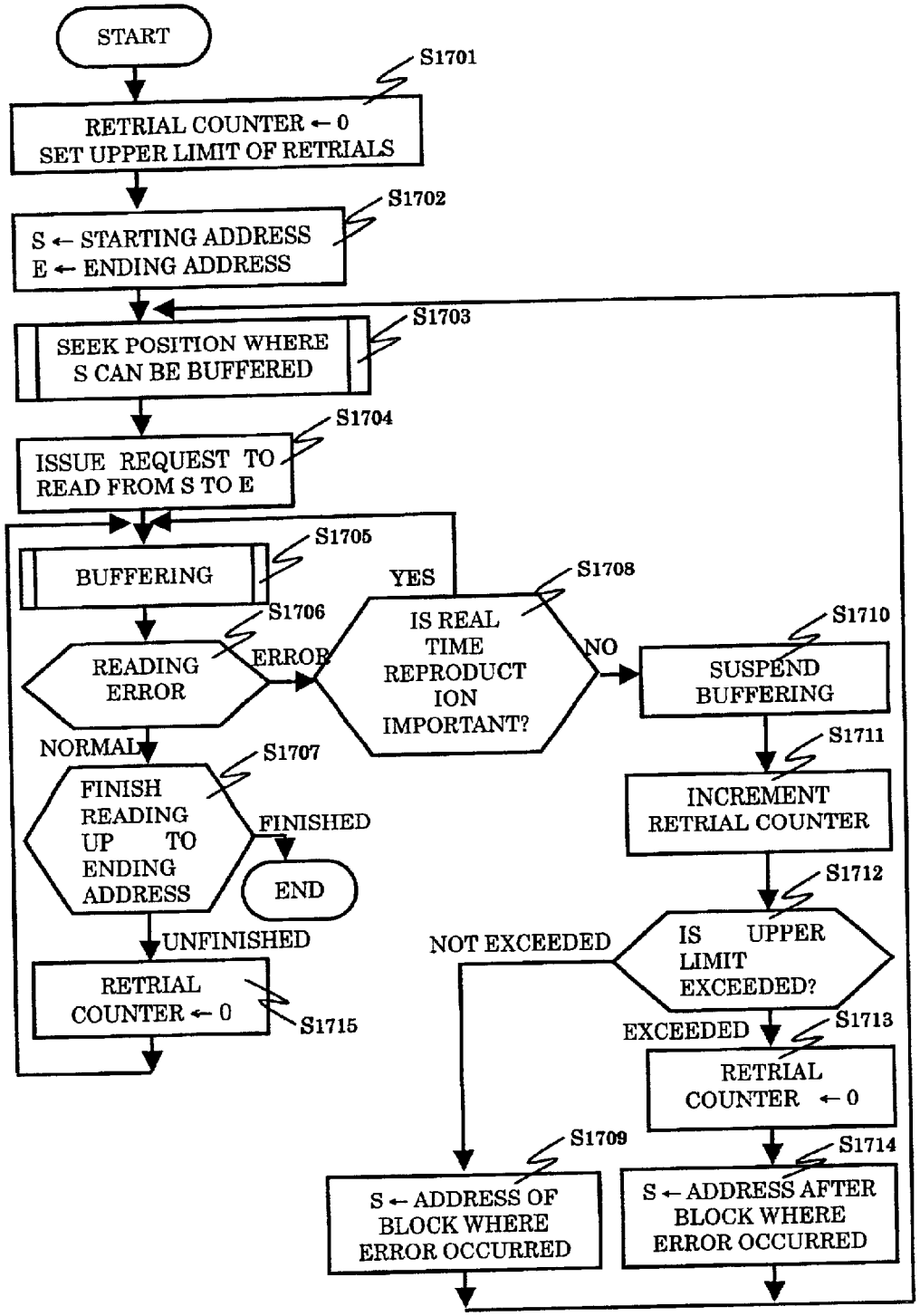
FIG. 17 is a flow chart showing the operation of CPU in Embodiment 11.

First, CPU 6 initializes the retrial counter (FIG. 17, Step S1701), and then substitutes the read-starting address for the variable S and substitutes the final read-ending address for the variable E (FIG. 17, Step S1702).

In the next step, CPU 6 gives to the signal processing circuit 3 a direction to have the pickup 2 seek the address on the recording medium 1 represented by the variable S (FIG. 17, Step S1703), and issues a read command to the optical disk controller 5 (FIG. 17, Step S1704). Then, buffering (FIG. 17, Step S1705) is performed by the optical disk controller 5. When the buffering is over, the ending status information is sent to CPU 6.

That is, each time the buffering of one block is over, the optical disk controller 5 informs CPU 6 of the buffering state (whether the buffering of one block ended normally or ended with an error). After that, even if the buffering state is normal, buffering is continued with the next address on the recording medium 1.

If the ending status information indicates normal ending, CPU 6 clears the retrial counter to 0, and continues to watch the buffering state until all the data, the reproduction of which was requested by the host computer 8, have been read (FIG. 17, Steps S1705→S1706→S1707). If, on the other hand, the ending status information indicates error ending, it is judged whether an indication that "real time reproduction is important" is given by the parameter of a reproduction request issued by host computer 8 (FIG. 17, Step S1708).

If an indication that "real time reproduction is important" is not given by the parameter issued by the host computer 8, CPU 6 issues to the optical disk controller 5 a direction to suspend buffering (FIG. 7, Step S1710), increments the retrial counter (FIG. 7, Step S1711) and judges if the retrial counter has exceeded the predetermined upper limit of retrials.

And if the retrial counter has not exceeded the upper limit of retrials, CPU 6 issues to the optical disk controller 5 a read command to retry reading the block where the reading error occurred (FIG. 17, Steps S1709→S1703→S1704→S1705→S1706). If, on the other hand, the retrial counter has exceeded the upper limit, CPU 6 gives up reading the block where the reading error occurred and issues to the optical disk controller 5 a read command to read the next block (FIG. 17, Steps S1713→S1714→S1703→S1704→S1705→S1706→S1707→S1708→S1709).

If, on the other hand, an indication that "real time reproduction is important" is given by the parameter of the reproduction request issued by the host computer 8, CPU 6 processes the defective block in the following way.

That is, the system is so arranged that even if the error of the defective block can not be corrected and the defective block can not be read precisely, CPU 6 does not issue a direction to suspend buffering. That means that the optical disk controller 5 continues buffering (FIG. 17, Steps S1705→S1706).

As set forth above, the present embodiment can achieve the same effect as Embodiment 10. In other words, in case an indication that "real time reproduction is important" is given by the parameter of the reproduction request issued by the host computer 8, even if the reading of a block is an error, the process proceeds to read the next block without interruption.

Embodiment 12

The configuration of the present embodiment will be explained with emphasis on the points different from those in Embodiment 1 or 2.

Figure 18:
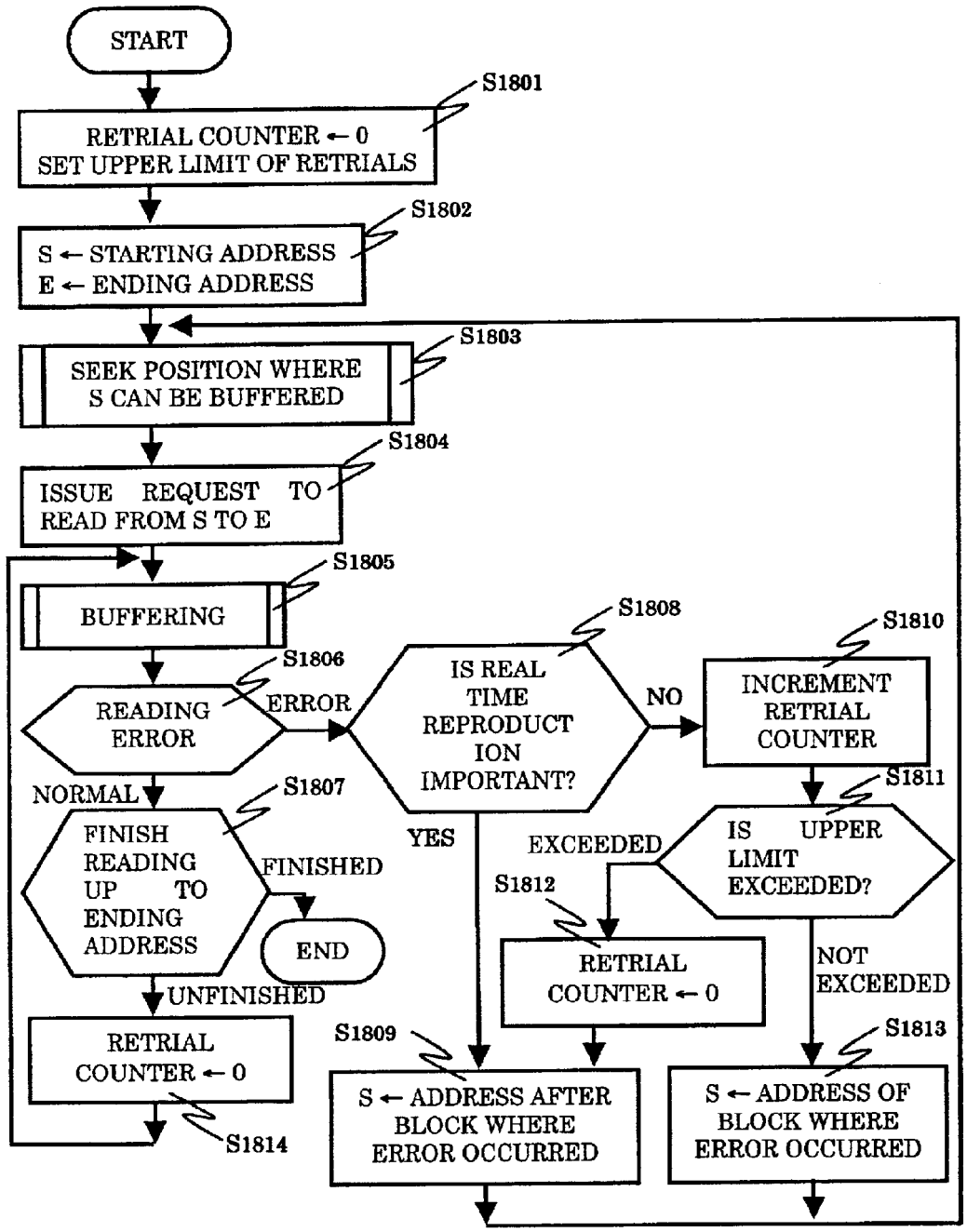
FIG. 18 is a flow chart showing the operation of CPU in Embodiment 12.

First, CPU 6 initializes the retrial counter (FIG. 18, Step S1801), and then substitutes the read-starting address for the variable S and substitutes the final read-ending address for the variable E (FIG. 18, Step S1802).

In the next step, CPU 6 gives to the signal processing circuit 3 a direction to have the pickup 2 seek the address on the recording medium 1 represented by the variable S (FIG. 18, Step S1803), and issues a read command to the optical disk controller 5 (FIG. 18, Step S1804). Then, buffering (FIG. 18, Step S1805) is performed by the optical disk controller 5. When the buffering is over, the ending status information is sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

Then, if the ending status information indicates normal ending, CPU 6 clears the retrial counter to 0, and continues to watch the buffering state until all the data, the reproduction of which was requested by the host computer 8, have been read (FIG. 18, Steps S1805→S1806→S1807). If, on the other hand, the ending status information indicates error ending, it is judged whether an indication that "real time reproduction is important" is given by the parameter of the reproduction request issued by host computer 8 (FIG. 18, Step S1808).

If an indication that "real time reproduction is important" is not given by the parameter of the reproduction request issued by the host computer 8, CPU 6 increments the retrial counter (FIG. 18, Step S1810) and judges if the retrial counter has exceeded the predetermined upper limit of retrials.

And if the retrial counter has not exceeded the upper limit of retrials, CPU 6 issues to the optical disk controller 5 a read command to retry reading the block where the reading error occurred (FIG. 18, Steps S1813→S1803→S1804→S1805→S1806). If, on the other hand, the retrial counter has exceeded the upper limit, CPU 6 gives up reading the block where the reading error occurred and issues to the optical disk controller 5 a read command to read the next block (FIG. 18, Steps S1812→S1809→S1803→S1804→S1805→S1806→S1807→S1808→S1809).

If, on the other hand, an indication that "real time reproduction is important" is given by the parameter of the reproduction request issued by the host computer 8, CPU 6 processes the defective block in the following way.

That is, even if the error can not be corrected on the defective block, CPU 6 regards the buffered data as valid and does not retry reading. In other words, the system is so configured that CPU 6 issues to the optical disk controller 5 a read command to continue buffering from the address just after the defective block on the recording medium 1, that is, at the position next to the one where the defective block is buffered (FIG. 18, Steps S1809→S1803→S1804→S1805→S1806).

The present embodiment, as set forth above, is so configured that in case an indication that "real time reproduction is important" is given by the parameter of the reproduction request issued by the host computer 8, reading the block is not tried but the next block will be read out.

Embodiment 13

The configuration of the present embodiment will be explained with emphasis on the points different from those in Embodiment 1 or 2.

Figure 19:
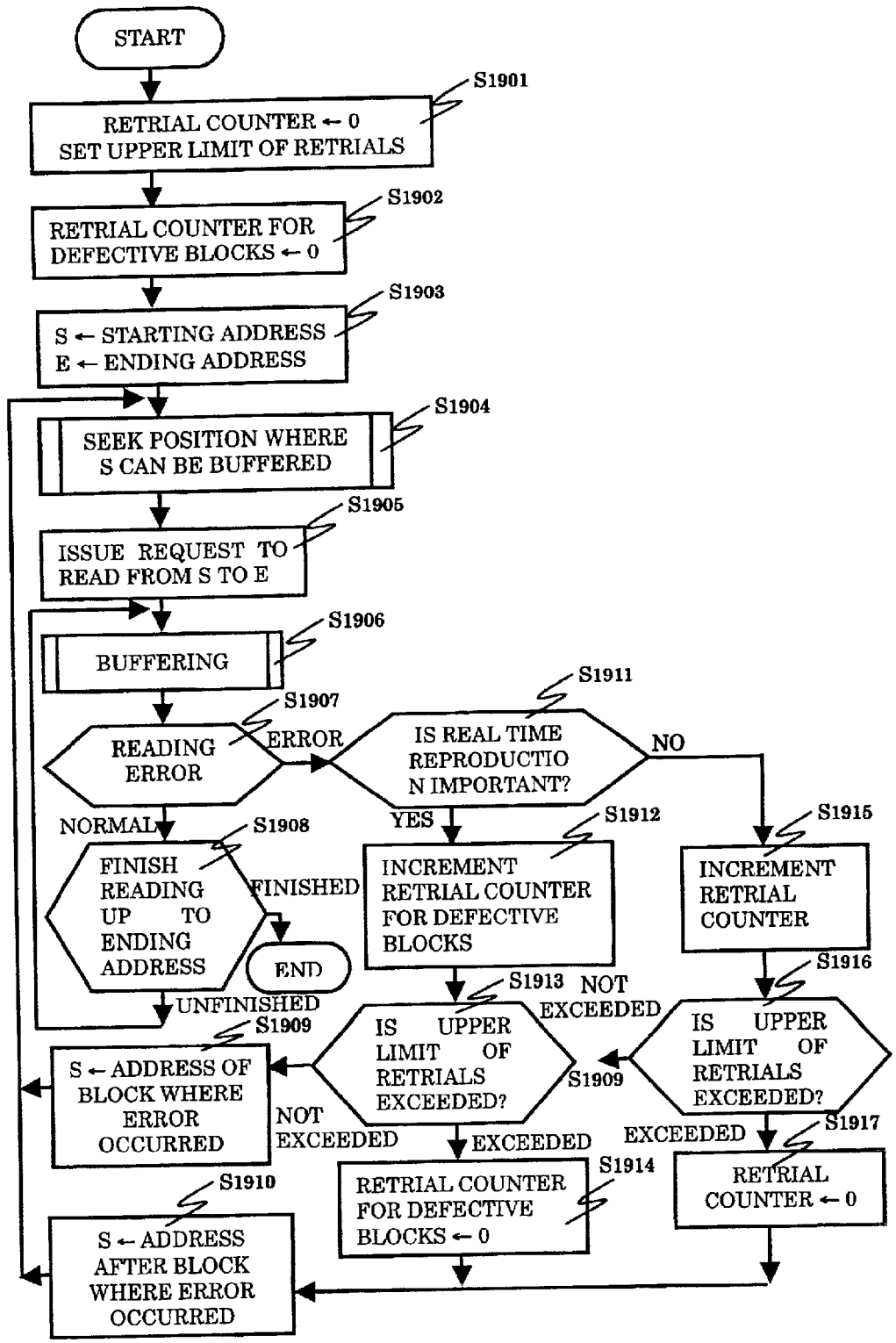
FIG. 19 is a flow chart showing the operation of CPU in Embodiment 13.

First, CPU 6 initializes the retrial counter (FIG. 19, Step S1901), and initializes the retrial counter for defective blocks (FIG. 19, Step S1902), then substitutes the read-starting address for the variable S and substitutes the final read-ending address for the variable E (FIG. 19, Step S1903). The retrial counter for defective blocks is a retrial counter for use in detecting defective blocks as will be described later.

In the next step, CPU 6 gives to the signal processing circuit 3 a direction to have the pickup 2 seek the address on the recording medium 1 represented by the variable S (FIG. 19, Step S1904), and issues a read command to the optical disk controller 5 (FIG. 19, Step S1905). Then, buffering (FIG. 19, Step S1906) is performed by the optical disk controller 5. When the buffering is over, the ending status information is sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

If the ending status information indicates normal ending, CPU 6 clears the retrial counter to 0, and continues to watch the buffering state until all the data, the reproduction of which was requested by the host computer 8, have been read (FIG. 19, Steps S1906→S1907→S1908). If, on the other hand, the ending status information indicates error ending, it is judged whether an indication that "real time reproduction is important" is given by the parameter of the reproduction request issued by host computer 8 (FIG. 19, Step S1911).

If an indication that "real time reproduction is important" is not given by the parameter of reproduction request issued by the host computer 8, CPU 6 increments the retrial counter (FIG. 19, Step S1915) and judges if the retrial counter has exceeded the predetermined upper limit of retrials.

And if the retrial counter has not exceeded the upper limit of retrials, CPU 6 issues to the optical disk controller 5 a read command to retry reading the block where the reading error occurred (FIG. 19, Steps S1909→S1904→S1905→S1906→S1907). If, on the other hand, the retrial counter has exceeded the upper limit, CPU 6 gives up reading the block where the reading error occurred and issues to the optical disk controller 5 a read command to read the next block (FIG. 19, Steps S1917→S1910→S1904→S1905→S1906→S1907).

If, on the other hand, an indication that "real time reproduction is important" is given by the parameter of the reproduction request issued by the host computer 8, CPU 6 processes the defective block in the following way.

That is, CPU 6 increments the retrial counter (FIG. 19, Step S1912) and judges if the retrial counter has exceeded the predetermined upper limit of retrials (two or three times, for example).

And if the retrial counter for defective blocks has not exceeded the upper limit of retrials, CPU 6 issues to the optical disk controller 5 a read command to retry reading the block where the reading error occurred (FIG. 19, Steps S1909→S1904→S1905→S1906→S1907). If, on the other hand, the retrial counter has exceeded the upper limit, CPU 6 gives up reading the block where the reading error occurred and issues to the optical disk controller 5 a read command to read the next block (FIG. 19, Steps S1914→S1910→S1904→S1905→S1906→S1907).

The present embodiment, as set forth above, is so configured that in case an indication that "real time reproduction is important" is given by the parameter of the reproduction request issued by the host computer 8, reading the block where reading error occurred is retried a specific number of times.

Embodiment 14

The processing of a defective block as described in Embodiment 1 may be limited to cases where an indication that "real time reproduction is important" is given by the parameter of a reproduction request issued by the host computer 8.

The operation of CPU 6 is basically the same as that in Embodiment 1 (except that in the present embodiment, a step of judging whether an indication that "real time reproduction is important" is given or not—the step described in Embodiment 10—is added) and will not be explained. The operation of the optical disk controller 5 will be explained with reference to FIG. 20.

Figure 20:
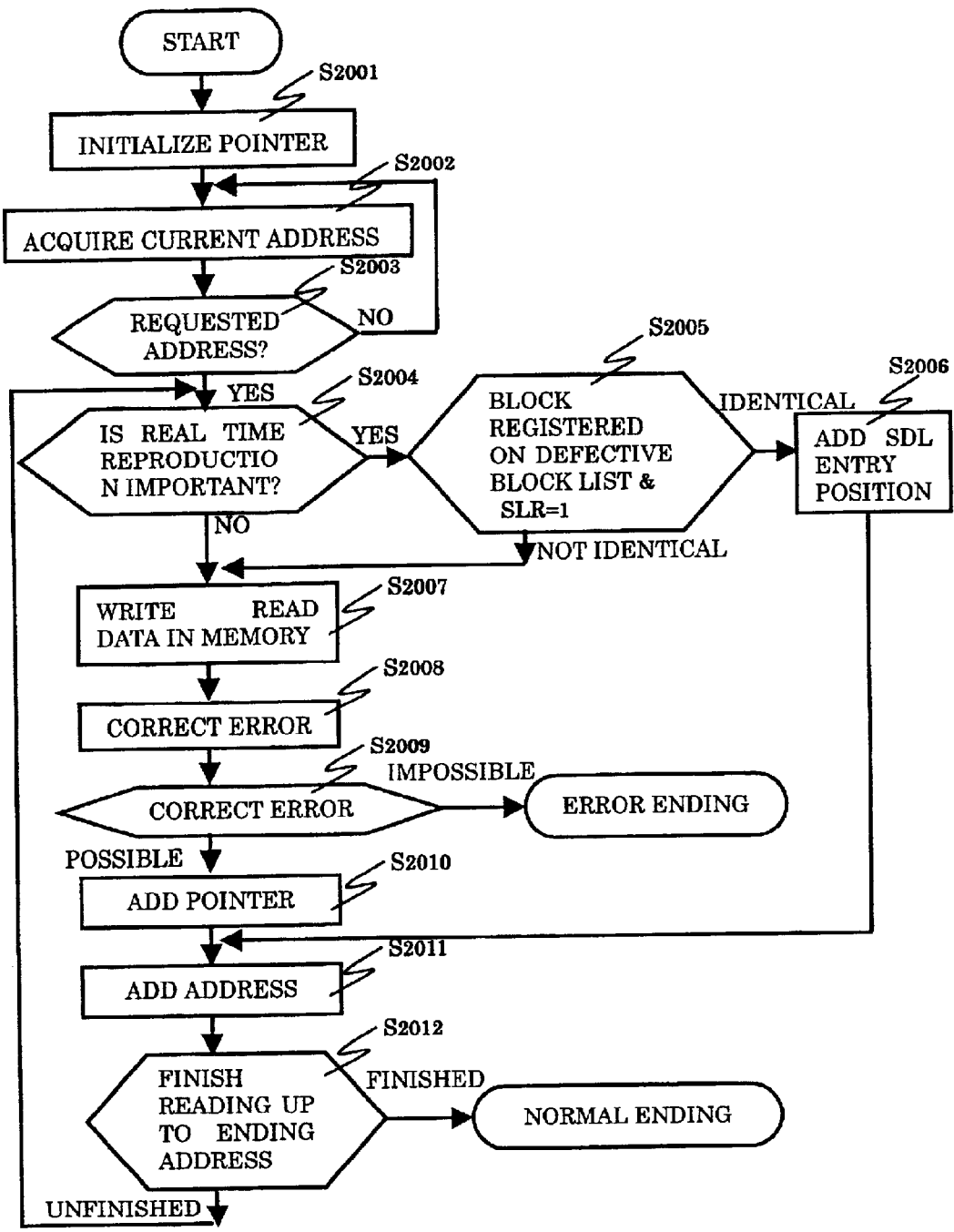
FIG. 20 is a flow chart showing the operation of the optical disk controller in Embodiment 14.

First, receiving a read command issued by CPU 6 as mentioned above, the optical disk controller 5 initializes the pointer with a value given in the "buffer page address" field of the read command (FIG. 20, Step S2001). The value given in the "buffer page address" field of the read command indicates the position on the memory 4 where data read out from the recording medium 1 is written as mentioned above.

Then, the optical disk controller 5 watches the address on the recording medium 1 (FIG. 20, Step S2002), and reads out data from the value (that is, the read-starting address) given in the "the head address" field of the read command and begins to write data on the memory 4.

Then, the optical disk controller 5 also processes a defective block in the following way.

That is, the optical disk controller 5 judges whether an indication that "real time reproduction is important" is given by the parameter of the read command (FIG. 20, Step S2004). If an indication that "real time reproduction is important" is given, the entry position specified in the "SDL point" field of the defective block list setting command (namely, the address of the defective block registered in the defective block list) and the address of the block to be read out are checked against each other (FIG. 20, Step S2005).

Here, in case an indication that "real time reproduction is important" is not given by the parameter of the read command or in case the two checked addresses are not identical, the optical disk controller 5 reads out data from the recording medium 1 and writes on the memory 4, and corrects the error of the written data (FIG. 20, Steps S2007→S2008).

If an error correction can not be made (FIG. 20, Step S2009: impossible), the optical disk controller 5 makes error ending, and notified the error ending status to CPU 6. This error ending status is judged by CPU 6 at S507 in FIG. 5 as mentioned above.

If, on the other hand, an error correction is made (FIG. 20, Step S2009: possible), the pointer and the address for the next block to be buffered at the next position on the memory 4 are added (FIG. 20, Steps S2010→S2011), and then it is judged whether all data of the length specified by CPU 20 have been read (FIG. 20, Step S2012).

If all the data have not been read (FIG. 20, Step S2012: not finished), the process returns to S2004, and the entry position and the address after the above-mentioned addition are checked. If, on the other hand, all the data have been read (FIG. 20, Step S2012: finished), the optical disk controller 5 makes normal ending and notified the normal ending status to CPU 20. The normal ending status is judged by CPU 6 at S507 shown in FIG. 5 as mentioned above.

If, on the other hand, the two addresses checked at Step S2004 are found to be identical, the optical disk controller 5 further checks the SLR flag of the defective block.

And if this SLR flag is "0," the block is an ordinary defective block. Therefore, the optical disk controller 5 sends to CPU 6 information on the status of the defective block detection error and ends the reading process. CPU 6, which is informed of the status of the defective block detection error, acquires from the defective block list the address of an alternative block corresponding to defective block. For this alternative block, CPU 6 issues a read command to the optical disk controller 5.

If, on the other hand, the SLR flag is "1," the block is an RTR defective block. Therefore, the optical disk controller 5 advances the entry position to the next (FIG. 20, Step S2006) and does not read this defective block but adds an address to read the next block (FIG. 20, Step S2011).

The present embodiment, as set forth above, produces the same results as Embodiment 1 only when an indication an indication that "real time reproduction is important" is given by the parameter of the reproduction request issued by the host computer 8.

Embodiment 15

The processing of a defective block explained in Embodiment 2 may be limited to cases where an indication that "real time reproduction is important" is given by the parameter of a reproduction request issued by the host computer 8.

Figure 21:
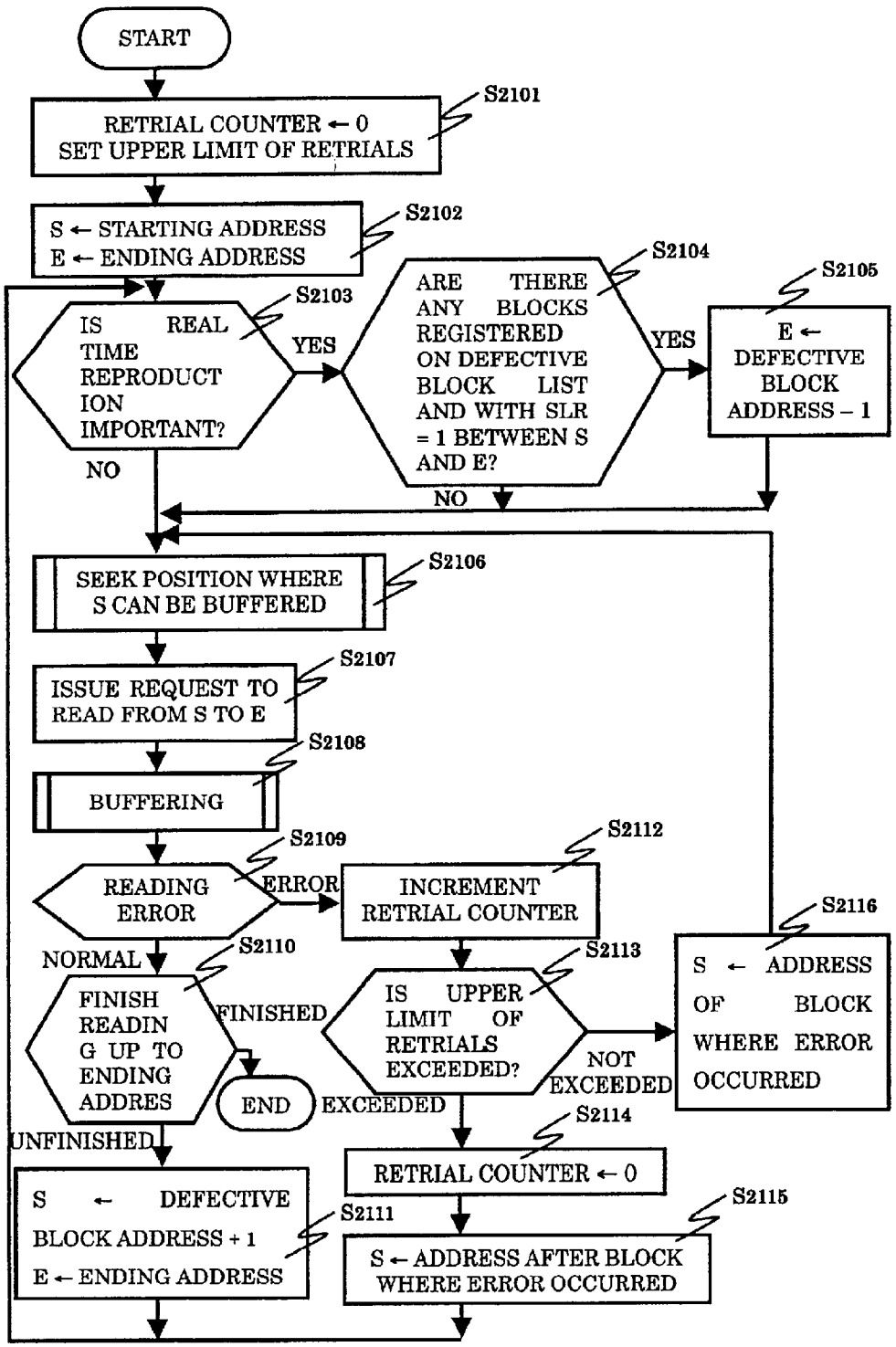
FIG. 21 is a flow chart showing the operation of CPU in Embodiment 15.

That is, as in embodiment 1, CPU 6 initializes the retrial counter (FIG. 21, Step S2101), then substitutes the read-starting address for the variable S and substitutes the final read-ending address for the variable E (FIG. 21, Step S2102).

Then, CPU 6 judges whether an indication that "real time reproduction is important" is given by the parameter of the reproduction request issued by the host computer 8 (FIG. 21, Step S2103). If an indication that "real time reproduction is important" is given, CPU 6 checks to see if a defective block with the SLR flag being "1" is present between the address on the recording medium 1 represented by the variable S and the address on the recording medium 1 represented by the variable E on the basis of the contents of the defective block list that have been acquired from the recording medium 1 (FIG. 21, Step S2104).

And in case an indication that "real time reproduction is important" is not given by the parameter of the read command or in case no defective block with the SLR flag being "1" is present, CPU 6 gives to the signal processing circuit 3 a direction to have the pickup 2 seek the address on the recording medium 1 represented by the variable S (FIG. 21, Step S2106), and issues a read command to the optical disk controller 5 (FIG. 21, Step S2107). Then, buffering (FIG. 21, Step S2108) is performed by the optical disk controller 5. When the buffering is over, the ending status information is sent to CPU 6 (FIG. 21, Step S2109).

If the ending status information indicates normal ending, CPU 6 judges whether all the data of the length specified by the host computer 8 have been read. If all the data have been read, CPU 6 ends the reading process (FIG. 21, Step S2110: finished). If the ending status information indicates error ending, CPU 6 increments the retrial counter and judges if the retrial counter has exceeded the predetermined upper limit of retrials (FIG. 21, Steps S2112→S2113).

And if the retrial counter has not exceeded the upper limit of retrials, CPU 6 issues to the optical disk controller 5 a read command to retry reading the block where the reading error occurred (FIG. 21, Steps S2116→S2106→S2107→S2108→S2109). If, on the other hand, the retrial counter has exceeded the upper limit, CPU 6 gives up reading the block where the reading error occurred and issues to the optical disk controller 5 a read command to read the next block (FIG. 21, Steps S2114→S2115→S2103→S2104→S2105→S2106→S2107→S2108→S2109).

Judging at S2104 that a defective block with the SLR flag being "1" is present between the address on the recording medium 1 represented by the variable S and the address on the recording medium 1 represented by the variable E, CPU 6 performs the following defective block processing.

If, for example, the address of the defective block is address A, CPU 6 issues to the optical disk controller 5 a read command to read from address S to address A−1 (just before the defective block). And in the next read command, CPU 6 specifies a reading scope from address A+1 (just after the defective block) to address E.

That is, before issuing a read command to the optical disk controller 5, CPU 6 specifies the earliest address A between address S and address E out of the addresses of defective blocks registered on the defective block list and substitutes the value A−1 just before that for the variable E (FIG. 21, Step S2105).

And the process is performed from S2106 to S2109. When buffering from address S to address A−1 is finished, CPU 6 clears the retrial counter to 0, and substitutes address A+1 (just after the defective block) for the variable S and substitutes the intrinsically final read-ending address for the variable E (FIG. 21, Step S2111). After that, CPU 6 issues a read command to the optical disk controller 5 (FIG. 21, Steps S2103→S2104→S2106→S2107→S2108→S2109).

As set forth above, the present embodiment can achieve the same effect as Embodiment 2 only when an indication that "real time reproduction is important" is given by the parameter of a reproduction request issued by the host computer 8.

Embodiment 16

The processing of a defective block explained in Embodiment 3 may be limited to cases where an indication that "real time reproduction is important" is given by the parameter of a reproduction request issued by the host computer 8. The operation of CPU 6 is basically the same as that in Embodiment 3 (except that in the present embodiment, a step of judging whether an indication that "real time reproduction is important" is given or not—the step described in Embodiment 10—is added) and will not be explained. The operation of the optical disk controller 5 will be explained in the following.

Figure 22:
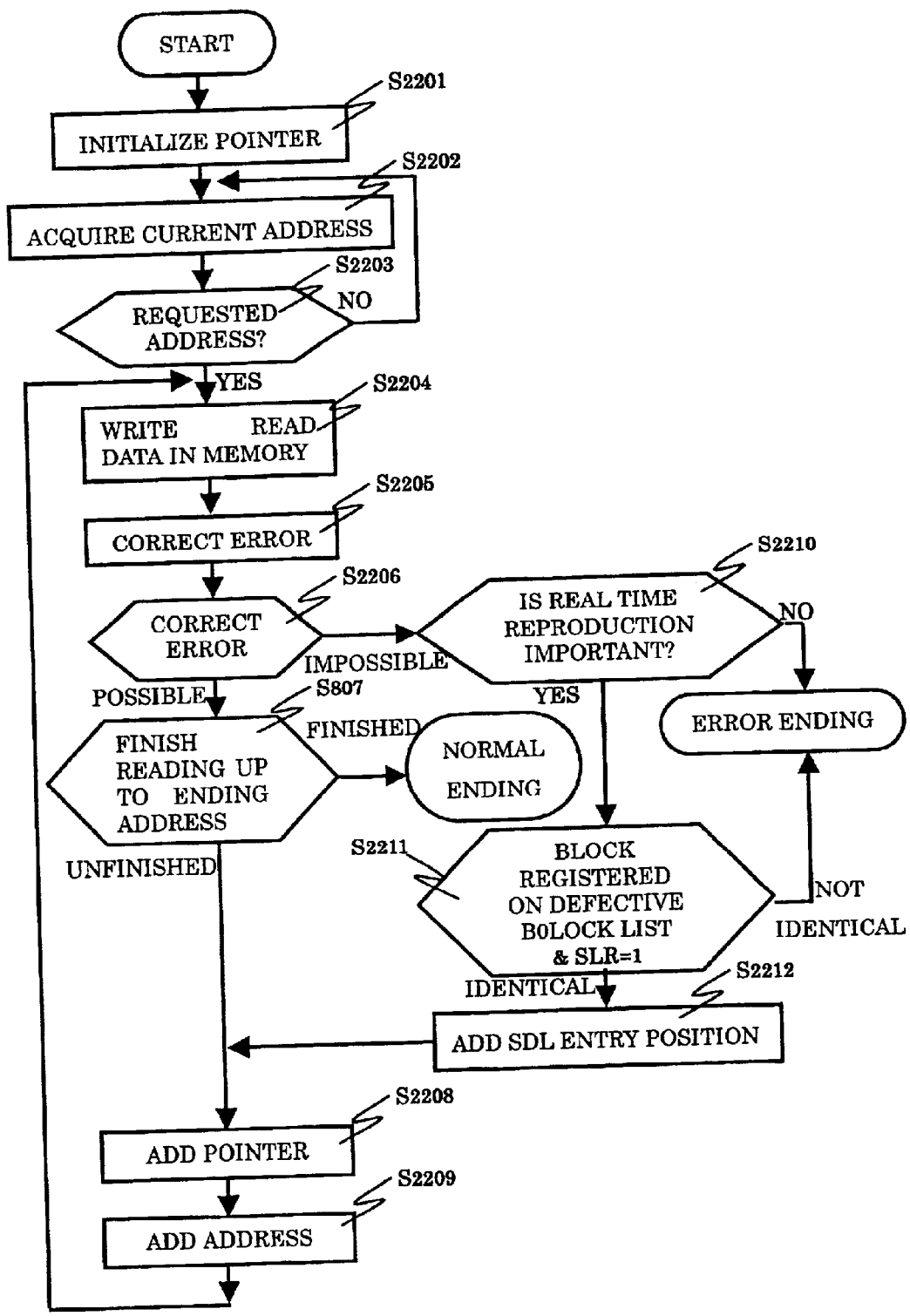
FIG. 22 is a flow chart showing the operation of the optical disk controller in Embodiment 16.

First, receiving the read command issued by CPU 6 as mentioned above, the optical disk controller 5 initializes the pointer with a value specified in the "buffer page address" field of the read command (FIG. 22, Step S2201). The value specified in the "buffer page address" field of the read command indicates a position on the memory 4 where data read out from the recording medium 1 is written as mentioned above.

Then, the optical disk controller 5 watches the address on the recording medium 1 (FIG. 22, Step S2202), and reads out data from the value (that is, the read-starting address) specified in the "the head address" field of the read command and begins to write data on the memory 4.

Here, the optical disk controller 5 reads out data from the recording medium 1, writes on the memory 4 and corrects the error in the written data (FIG. 22, Steps S2204→S2205). And when error correction is made, the optical disk controller 5 judges whether all the data of the length specified by CPU 6 have been read (FIG. 22, Step S2207). If it is judged that all the data have been read, the optical disk controller 5 ends the process normally and informs CPU 6 of normal ending status. The normal ending status is judged by CPU 6 at S507 in FIG. 5 as mentioned above.

If, on the other hand, all the data have not been read yet, the pointer and the address for the next block to be buffered at the next position on the memory 4 are added, and then the reading of data from the recording medium 1 is repeated (FIG. 22, Steps S2208→S2209→S2204→S2205→S2206).

Here, if the error correction could not be made at S2205, the optical disk controller 5 processes the defective block in the following way.

That is, the optical disk controller 5 judges whether an indication that "real time reproduction is important" is given by the parameter of the read command (FIG. 22, Steps S2210). If an indication that "real time reproduction is important" is given, the address of the block where an error occurred is checked against the address of the defective block registered on the defective block list (FIG. 22, Step S2211). In case the two addresses are not identical, the process is ended with an error, and the error ending status is notified to CPU 6. This error ending status is judged by CPU 6 at S507 in FIG. 5 as mentioned above.

Meanwhile, in case an indication that "real time reproduction is important" is not given by the parameter of the read command or the two checked addresses are identical, the SLR flag of the defective block is further checked. And if the SLR flag is "1," the block where the error occurred is an RTR defective block. Therefore, the optical disk controller 5 does not make error ending even if the error of the block can not be corrected and the block can not be read precisely. That is, the SDL entry position is advanced to the next, and then the pointer and the address are added (FIG. 22, Steps S2212→S2208→S2209). And then the reading of data from the recording medium 1 is repeated (FIG. 22, Steps S2204→S2205→S2206).

As set forth above, the present embodiment can achieve the same effect as Embodiment 3 only when an indication that "real time reproduction is important" is given by the parameter of a reproduction request issued by the host computer 8.

Embodiment 17

The processing of a defective block explained in Embodiment 4 may be limited to cases where an indication that "real time reproduction is important" is given by the parameter of reproduction request issued by the host computer 8.

Figure 23:
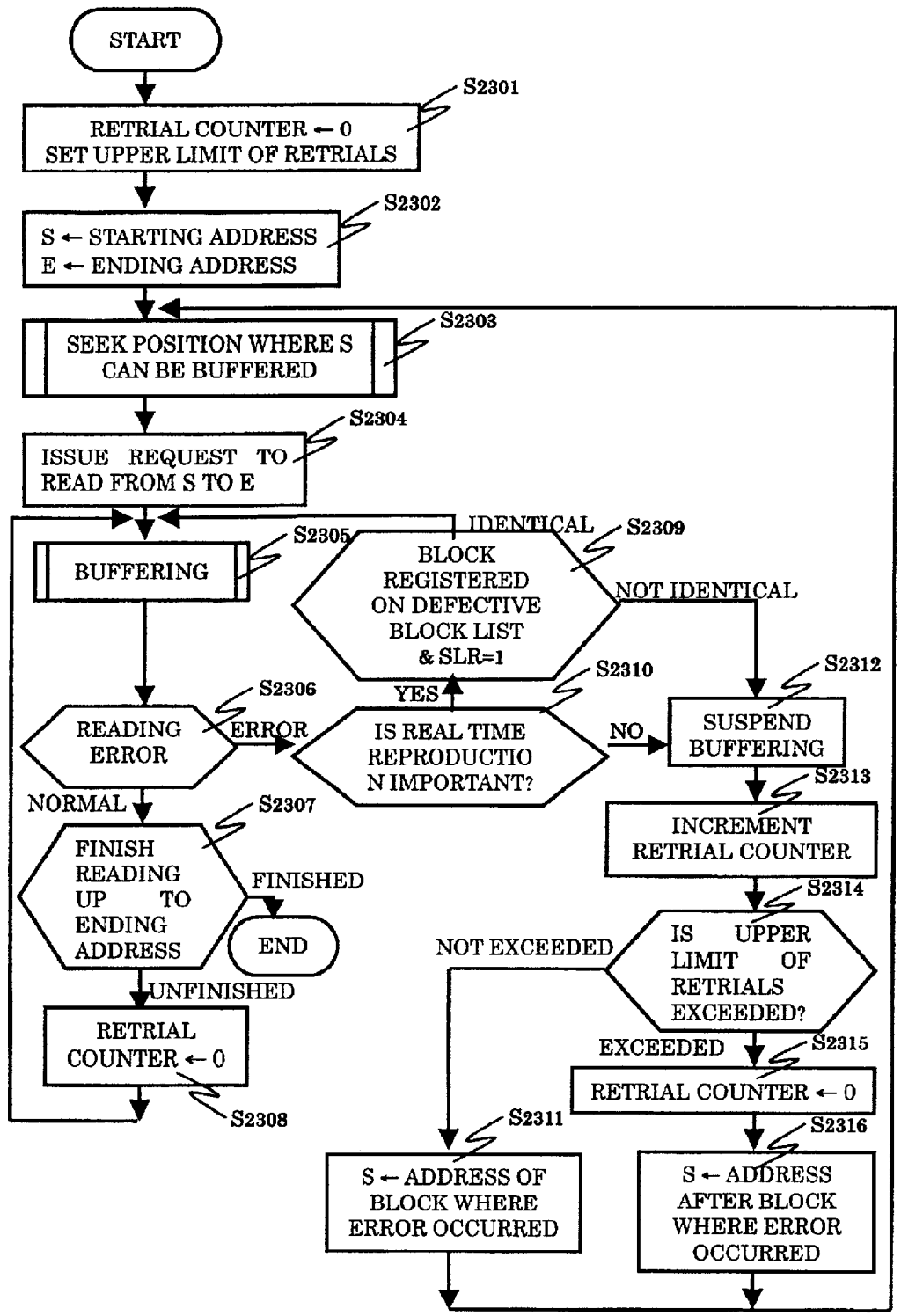
FIG. 23 is a flow chart showing the operation of CPU in Embodiment 17.

That is, CPU 6 initializes the retrial counter (FIG. 23, Step S2301), and substitutes the read-starting address for the variable S and substitutes the final read-ending address for the variable E (FIG. 23, Step S2302).

In the next step, CPU 6 gives to the signal processing circuit 3 a direction to have the pickup 2 seek the address on the recording medium 1 represented by the variable S (FIG. 23, Step S2303), and issues a read command to the optical disk controller 5 (FIG. 23, Step S2304). Then, buffering (FIG. 23, Step S2305) is performed by the optical disk controller 5. As the buffering is finished, the ending status information will be sent to CPU 6.

That is, each time the buffering of one block is over, the optical disk controller 5 informs CPU 6 of the buffering state (whether the buffering of one block ended normally or ended with an error). After informing CPU 6 of that, the optical disk controller 5 continues buffering from the next address on the recording medium 1, whether the buffering state is normal or an error.

Then, if the ending status information indicates normal ending, CPU 6 clears the retrial counter to 0 and continues to watch the buffering state until all the data, the reproduction of which was requested by the host computer 8, have been read (FIG. 23, Steps S2308→S2305→S2307). If, on the other hand, the ending status information indicates error ending, it is judged whether an indication that "real time reproduction is important" is given by the parameter of the read command issued by the host computer 8 (FIG. 23, Step S2310).

And in case an indication that "real time reproduction is important" is not given by the parameter of the read command, the address of the block where an error occurred is checked against the address of the defective block registered on the defective block list (FIG. 23, Step S2309).

In case an indication that "real time reproduction is important" is not given by the parameter of the reproduction request issued by the host computer 8 or the two checked addresses are not identical, CPU 6 issues to the optical disk controller 5 a direction to suspend buffering (FIG. 23, Step S2312), and then increments the retrial counter (FIG. 23, Step S2313), and judges if the retrial counter has exceeded the predetermined upper limit of retrials.

And if the retrial counter has not exceeded the upper limit of retrials, CPU 6 issues to the optical disk controller 5 a read command to retry reading the block where the reading error occurred (FIG. 23, Steps S2311→S2303→S2304→S2305→S2306). If, on the other hand, the retrial counter has exceeded the upper limit, CPU 6 gives up reading the block where the reading error occurred and issues to the optical disk controller 5 a read command to read the next block (FIG. 23, Steps S2315→S2316→S2303→S2304→S2305→S2306→S2307→S2308→S2309).

Meanwhile, in case the two checked addresses are identical, the SLR flag of the defective block is further checked. And if the SLR flag is "1," the block where the error occurred is an RTR defective block, and CPU 6 processes the defective block in the following way.

That is, even if the error of the defective block can not be corrected and the block can not be read precisely, CPU 6 does not issues a direction to suspend buffering. That is, the system is so arranged that the optical disk controller 5 continues buffering (FIG. 23, Steps S2305→S2306).

As set forth above, the present embodiment can achieve the same effect as Embodiment 4 only when an indication that "real time reproduction is important" is given by the parameter of a reproduction request issued by the host computer 8.

Embodiment 18

The processing of a defective block explained in Embodiment 5 may be limited to cases where an indication that "real time reproduction is important" is given by the parameter of a reproduction request issued by the host computer 8.

Figure 24:
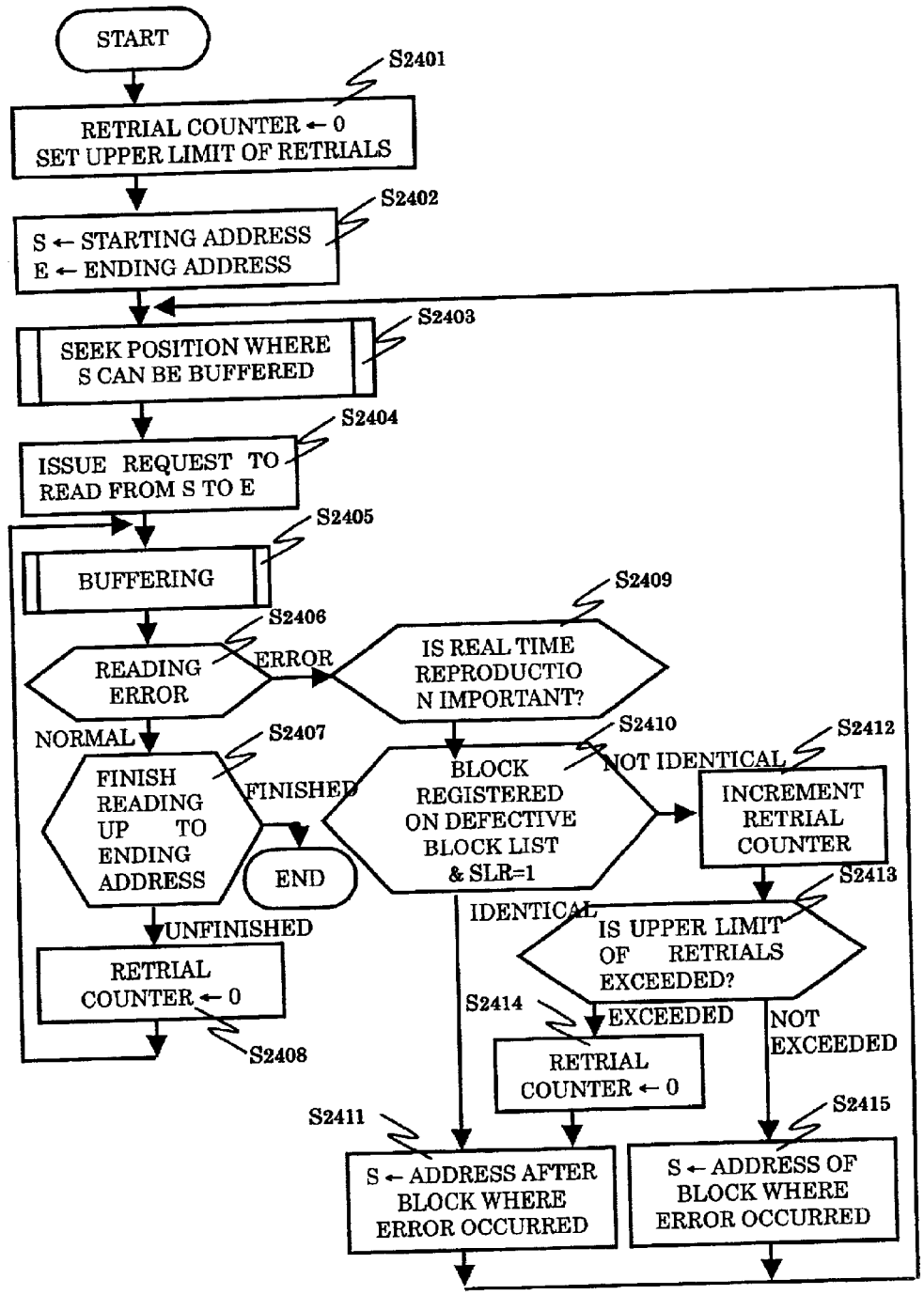
FIG. 24 is a flow chart showing the operation of CPU in Embodiment 18.

That is, CPU 6 initializes the retrial counter (FIG. 24, Step S2401), and substitutes the read-starting address for the variable S and substitutes the final read-ending address for the variable E (FIG. 24, Step S2402).

In the next step, CPU 6 gives to the signal processing circuit 3 a direction to have the pickup 2 seek the address on the recording medium 1 represented by the variable S (FIG. 24, Step S2403), and issues a read command to the optical disk controller 5 (FIG. 24, Step S2404). Then, buffering (FIG. 24, Step S2405) is performed by the optical disk controller 5. As the buffering is finished, the ending status information will be sent to CPU 6.

That is, each time the buffering of one block is over, the optical disk controller 5 informs CPU 6 of the buffering state (whether the buffering of one block ended normally or ended with an error).

In case the buffering state is normal, the optical disk controller 5 informs CPU 6 of the normal ending status and continues buffering from the next address on the recording medium 1. If, on the other hand, the buffering state is an error, the optical disk controller 5 suspends buffering and notified the error ending status to CPU 6.

Then, if the ending status information indicates normal ending, CPU 6 clears the retrial counter to 0 and continues to watch the buffering state until all the data, the reproduction of which was requested by the host computer 8, have been read (FIG. 24, Steps S2408→S2405→S2406→S2407). If, on the other hand, the ending status information indicates error ending, it is judged whether an indication that "real time reproduction is important" is given by the parameter of the read command issued by the host computer 8 (FIG. 24, Step S2409).

And if an indication that "real time reproduction is important" is given by the parameter of the reproduction request issued by the host computer 8, the address of the block where an error occurred is checked against the address of the defective block registered on the defective block list (FIG. 24, Step S2410).

In case an indication that "real time reproduction is important" is not given by the parameter of the reproduction request issued by the host computer 8 or the two checked addresses are not identical, CPU 6 increments the retrial counter (FIG. 24, Step S2412), and judges if the retrial counter has exceeded the predetermined upper limit of retrials.

And if the retrial counter has not exceeded the upper limit of retrials, CPU 6 issues to the optical disk controller 5 a read command to retry reading the block where the reading error occurred (FIG. 24, Steps S2415→S2403→S2404→S2405→S2406). If, on the other hand, the retrial counter has exceeded the upper limit, CPU 6 gives up reading the block where the reading error occurred and issues to the optical disk controller 5 a read command to read the next block (FIG. 24, Steps S2414→S2411→S2403→S2404→S2405→S2406→S2407→S2408→S2409).

Meanwhile, in case the two checked addresses are identical, the SLR flag of the defective block is further checked. And if the SLR flag is "1," the block where the error occurred is an RTR defective block, and CPU 6 processes the defective block in the following way.

That is, even if the error of the defective block can not be corrected, CPU 6 regards the buffered data as valid and does not retry reading. In other words, the system is so configured that CPU 6 issues to the optical disk controller 5 a read command to continue buffering from the address just after the defective block on the recording medium 1, that is, at the position next to the one where the defective block is buffered (FIG. 24, Steps S2411→S2403→S2404→S2405→S2406).

As set forth above, the present embodiment can achieve the same effect as Embodiment 5 only when an indication that "real time reproduction is important" is given by the parameter of the reproduction request issued by the host computer 8.

Embodiment 19

The processing of a defective block explained in Embodiment 6 may be limited to cases where an indication that "real time reproduction is important" is given by the parameter of a reproduction request issued by the host computer 8.

Figure 25:
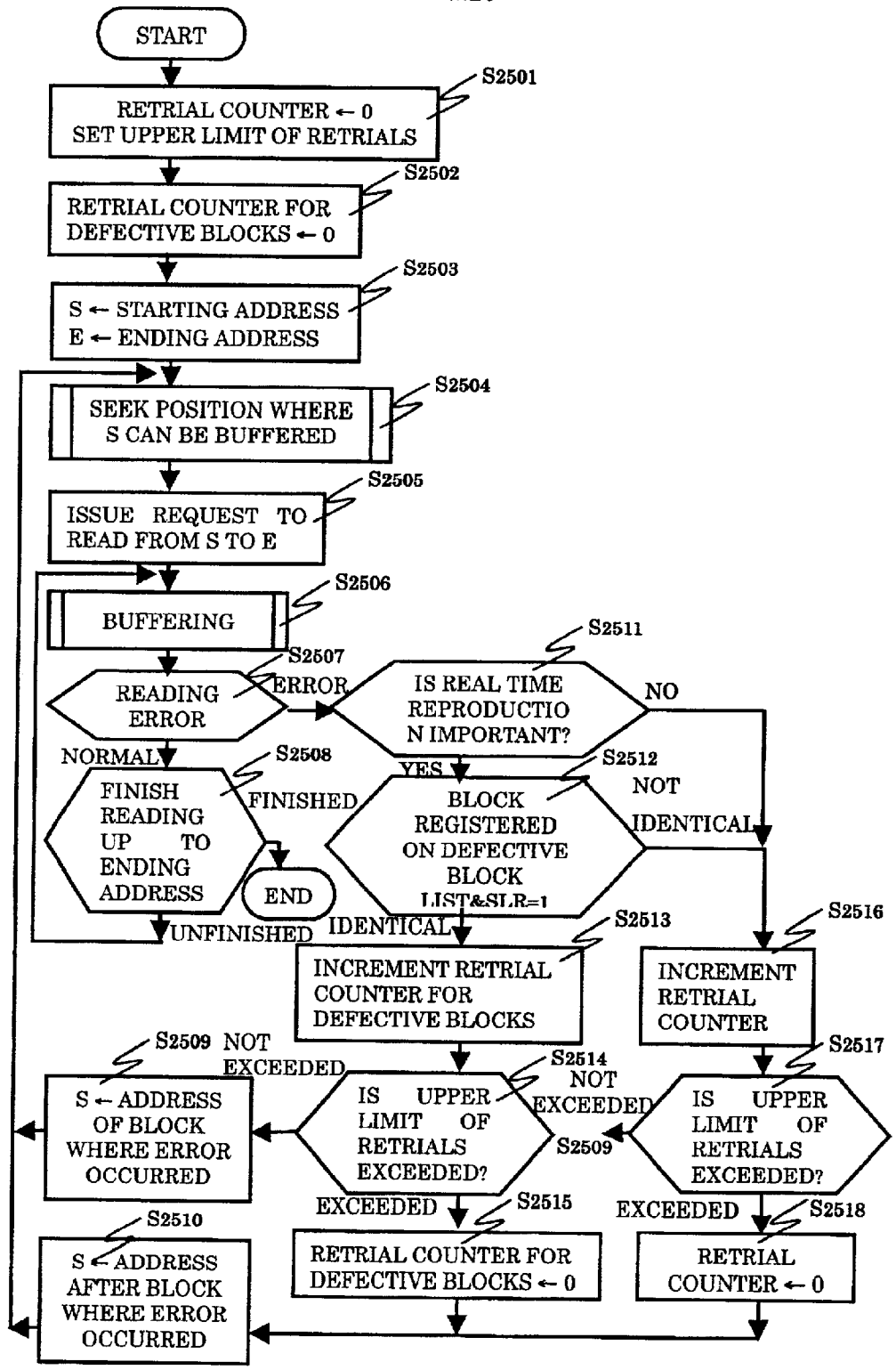
FIG. 25 is a flow chart showing the operation of CPU in Embodiment 19.

That is, CPU 6 initializes the retrial counter (FIG. 25, Step S2501), and initializes the retrial counter for defective blocks (FIG. 25, Step S2502), then substitutes the read-starting address for the variable S and substitutes the final read-ending address for the variable E (FIG. 25, Step S2503). The retrial counter for defective blocks is a retrial counter for use in detecting defective blocks as will be described later.

In the next step, CPU 6 gives to the signal processing circuit 3 a direction to have the pickup 2 seek the address on the recording medium 1 represented by the variable S (FIG. 25, Step S2504), and issues a read command to the optical disk controller 5 (FIG. 25, Step S2505). Then, buffering (FIG. 25, Step S2506) is performed by the optical disk controller 5. As the buffering is finished, the ending status information will be sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

Then, if the ending status information indicates normal ending, CPU 6 clears the retrial counter to 0, and continues to watch the buffering state until all the data, the reproduction of which was requested by the host computer 8, have been read (FIG. 25, Steps S2506→S2507→S2508). If, on the other hand, the ending status information indicates error ending, it is judged whether an indication that "real time reproduction is important" is given by the parameter of the read command issued by the host computer 8 (FIG. 25, Step S2511).

And if an indication that "real time reproduction is important" is given by the parameter of the reproduction request issued by the host computer 8, CPU 6 checks the address of the block where an error occurred against the address of the defective block registered on the defective block list (FIG. 25 Step S2512).

In case an indication that "real time reproduction is important" is not given by the parameter of the reproduction request issued by the host computer 8 or the two checked addresses are not identical, CPU 6 increments the retrial counter (FIG. 25, Step S2516), and judges if the retrial counter has exceeded the predetermined upper limit of retrials.

And if the retrial counter has not exceeded the upper limit of retrials, CPU 6 issues to the optical disk controller 5 a read command to retry reading the block where the reading error occurred (FIG. 25, Steps S2509→S2504→S2505→S2506→S2507). If, on the other hand, the retrial counter has exceeded the upper limit, CPU 6 gives up reading the block where the reading error occurred and issues to the optical disk controller 5 a read command to read the next block (FIG. 25, Steps S2518→S2510→S2504→S2505→S2506→S2507).

Meanwhile, in case the two checked addresses are identical, the SLR flag of the defective block is further checked. And if the SLR flag is "1," the block where the error occurred is an RTR defective block, and CPU 6 processes the defective block in the following way.

CPU 6 increments the retrial counter for defective blocks (FIG. 25, Step S2513), and judges if the retrial counter for defective blocks has exceeded the retrial upper limit predetermined by the system.

And if the retrial counter for defective blocks has not exceeded the upper limit of retrials, CPU 6 issues to the optical disk controller 5 a read command to retry reading the block where the reading error occurred (FIG. 25, Steps S2509→S2504→S2505→S2506→S2507). If, on the other hand, the retrial counter for defective blocks has exceeded the upper limit, CPU 6 gives up reading the block where the reading error occurred and issues to the optical disk controller 5 a read command to read the next block (FIG. 25, Steps S2515→S2510→S2504→S2505→S2506→S2507).

As set forth above, the present embodiment can achieve the same effect as Embodiment 6 only when an indication that "real time reproduction is important" is given by the parameter of a reproduction request issued by the host computer 8.

Embodiment 20

The processing of a defective block explained in Embodiment 7 may be limited to cases where an indication that "real time reproduction is important" is given by the parameter of reproduction request issued by the host computer 8.

Figure 26:
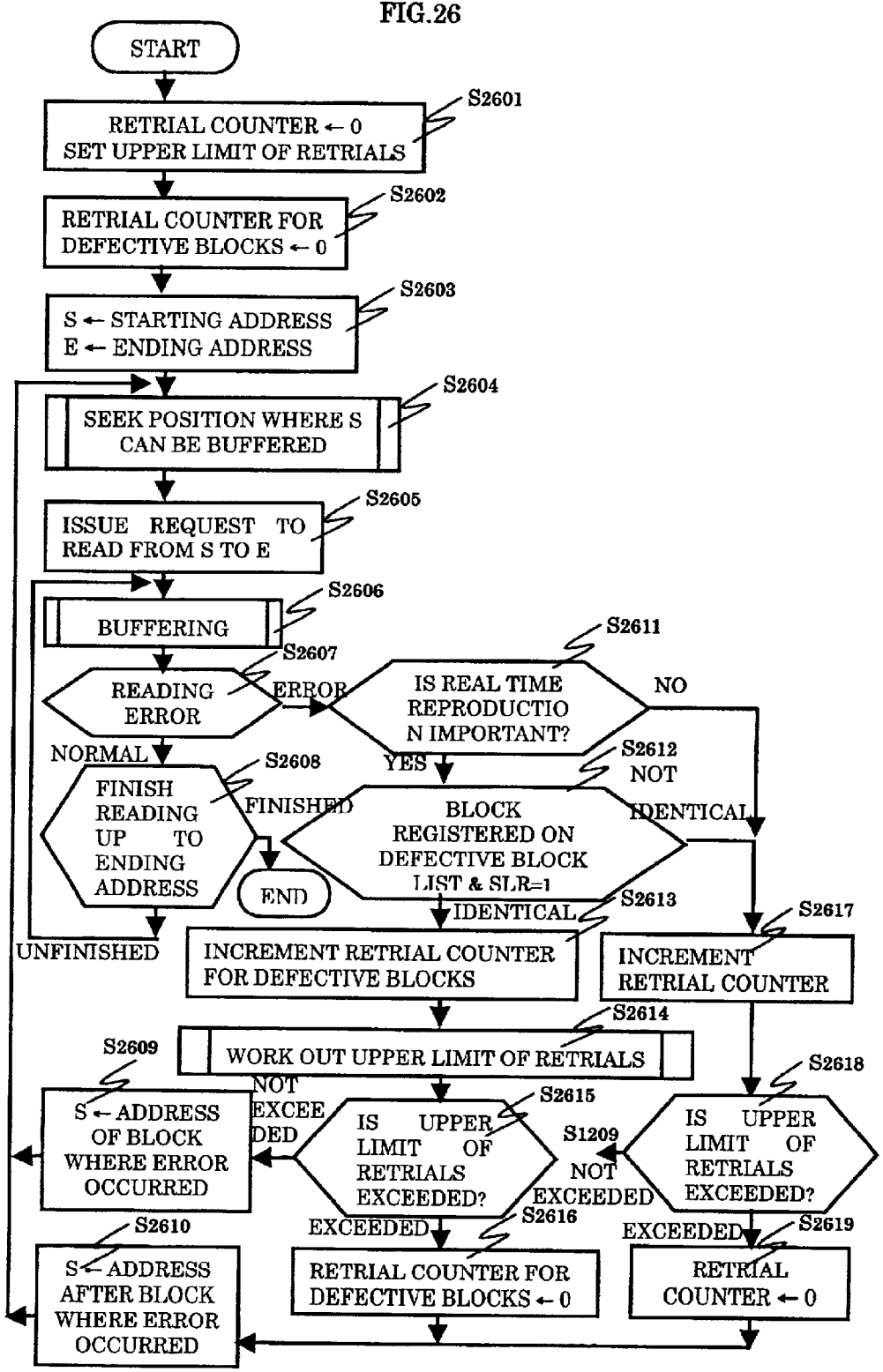
FIG. 26 is a flow chart showing the operation of CPU in Embodiment 20.

That is, CPU 6 initializes the retrial counter (FIG. 26, Step S2601), and initializes the retrial counter for defective blocks (FIG. 26, Step S2602), then substitutes the read-starting address for the variable S and substitutes the final read-ending address for the variable E (FIG. 26, Step S2603). The retrial counter for defective blocks is a retrial counter for use in detecting defective blocks as will be described later.

In the next step, CPU 6 gives to the signal processing circuit 3 a direction to have the pickup 2 seek the address on the recording medium 1 represented by the variable S (FIG. 26, Step S2604), and issues a read command to the optical disk controller 5 (FIG. 26, Step S2605). Then, buffering (FIG. 26, Step S2606) is performed by the optical disk controller 5. As the buffering is finished, the ending status information will be sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

Then, if the ending status information indicates normal ending, CPU 6 clears the retrial counter to 0, and continues to watch the buffering state until all the data, the reproduction of which was requested by the host computer 8, have been read (FIG. 26, Steps S2606→S2607→S2608). If, on the other hand, the ending status information indicates error ending, it is judged whether an indication that "real time reproduction is important" is given by the parameter of the read command issued by the host computer 8 (FIG. 26, Step S2611).

And if an indication that "real time reproduction is important" is given by the parameter of the reproduction request issued by the host computer 8, CPU 6 checks the address of the block where an error occurred against the address of the defective block registered on the defective block list (FIG. 26 Step S2612).

In case an indication that "real time reproduction is important" is not given by the parameter of the reproduction request issued by the host computer 8 or the two checked addresses are not identical, CPU 6 increments the retrial counter (FIG. 26, Step S2617), and judges if the retrial counter has exceeded the predetermined upper limit of retrials.

And if the retrial counter has not exceeded the upper limit of retrials, CPU 6 issues to the optical disk controller 5 a read command to retry reading the block where the reading error occurred (FIG. 26, Steps S2609→S2604→S2605→S2606→S2607). If, on the other hand, the retrial counter for defective blocks has exceeded the upper limit of retrials, CPU 6 gives up reading the block where the reading error occurred and issues to the optical disk controller 5 a read command to read the next block (FIG. 26, Steps S2619→S2610→S2604→S2605→S2606→S2607).

If the two addresses checked are found to be identical, the SLR flag of the defective block is further checked. And if the SLR flag is "1," the block where the error occurred is an RTR defective block, and CPU 6 processes the defective block in the following way.

CPU 6 increments the retrial counter for defective blocks (FIG. 26, Step S2613, and works out the upper limit of retrials for defective blocks (FIG. 26, Step S2614). And it is judged whether the retrial counter for defective blocks has exceeded the upper limit of reading retrials for defective blocks. The method of working out the upper limit of reading retrials for defective blocks is the same as that in Embodiment 7 and will not be explained again.

And if the retrial counter for defective blocks has not exceeded the upper limit of reading retrials for defective blocks, CPU 6 issues to the optical disk controller 5 a read command to retry reading the defective block (FIG. 26, Steps S2609→S2604→S2605→S2606→S2607). If, on the other hand, the retrial counter for defective blocks has exceeded the upper limit of reading retrials for defective blocks, CPU 6 gives up reading the defective block and issues to the optical disk controller 5 a read command to read the next block (FIG. 26, Steps S2616→S2610→S2604→S2605→S2606→S2607).

As set forth above, the present embodiment can achieve the same effect as Embodiment 7 only when an indication that "real time reproduction is important" is given by the parameter of the reproduction request issued by the host computer 8.

Embodiment 21

The processing of a defective block explained in Embodiment 8 may be limited to cases where an indication that "real time reproduction is important" is given by the parameter of a reproduction request issued by the host computer 8.

The method of working out the upper limit of reading retrials for defective blocks is the same as that in Embodiment 8 and will not be explained again.

As set forth above, the present embodiment can achieve the same effect as Embodiment 8 only when an indication that "real time reproduction is important" is given by the parameter of the reproduction request issued by the host computer 8.

Embodiment 22

The processing of a defective block explained in Embodiment 9 may be limited to cases where an indication that "real time reproduction is important" is given by the parameter of reproduction request issued by the host computer 8.

Figure 27:
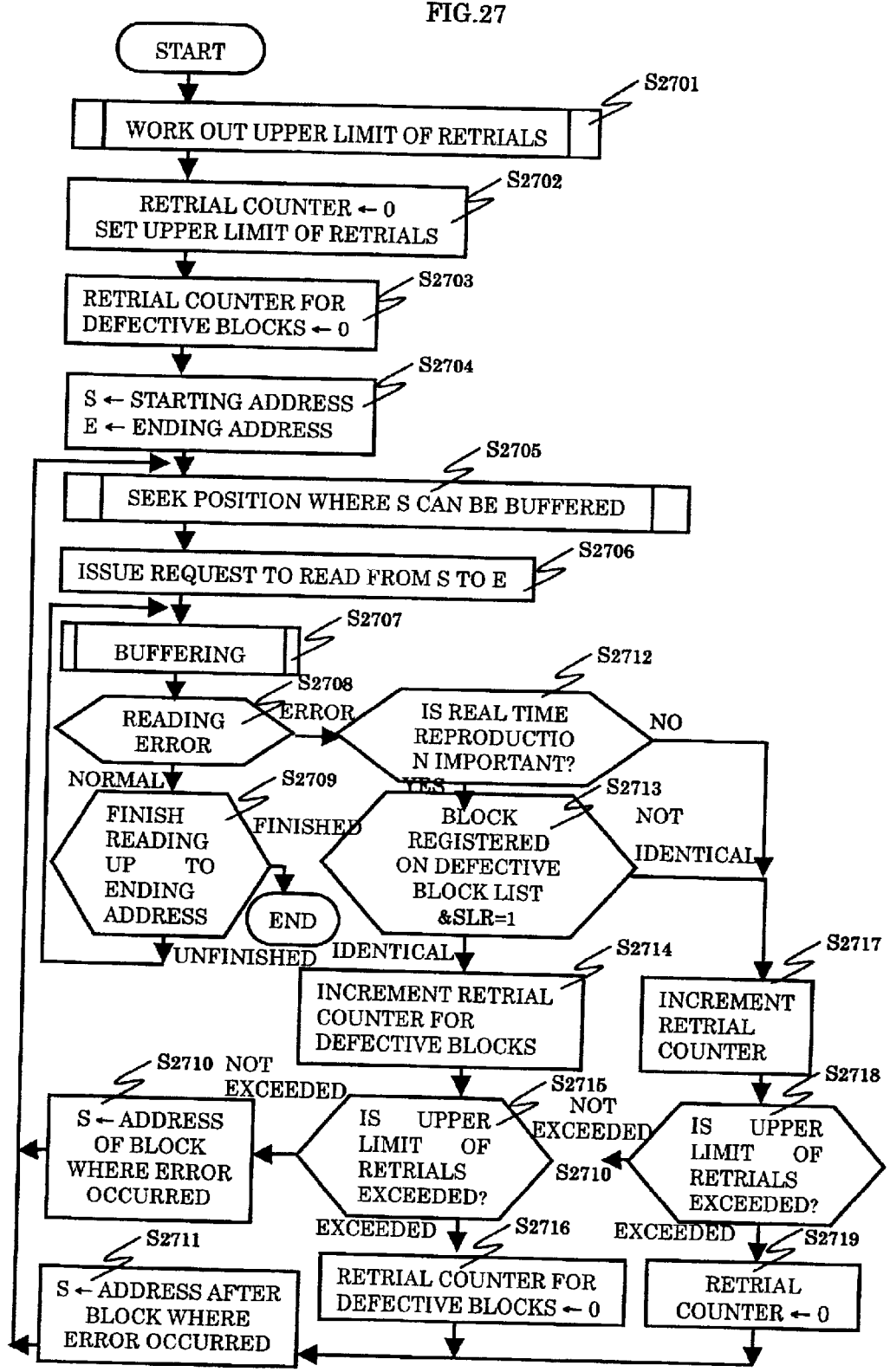
FIG. 27 is a flow chart showing the operation of CPU in Embodiment 22.

That is, CPU 6 works out the upper limit of retrials for defective blocks (FIG. 27, Step S2701). Then, CPU 6 initializes the retrial counter (FIG. 27, Step S2702), and initializes the retrial counter for defective blocks (FIG. 27, Step S2703), then substitutes the read-starting address for the variable S and substitutes the final read-ending address for the variable E (FIG. 27, Step S2704).

The retrial counter for defective blocks is a retrial counter for use in detecting defective blocks as will be described later. The method of working out the upper limit of reading retrials for defective blocks is the same as that in Embodiment 9 and will not be explained again.

In the next step, CPU 6 gives to the signal processing circuit 3 a direction to have the pickup 2 seek the address on the recording medium 1 represented by the variable S (FIG. 27, Step S2705), and issues a read command to the optical disk controller 5 (FIG. 27, Step S2706). Then, buffering (FIG. 27, Step S2707) is performed by the optical disk controller 5. As the buffering is finished, the ending status information will be sent to CPU 6.

That is, each time the buffering of one block is over, the optical disk controller 5 informs CPU 6 of the buffering state (whether the buffering of one block ended normally or ended with an error).

In case the buffering state is normal, CPU 6 is informed of the normal ending status and then buffering is continued with the next address on the recording medium 1. If, on the other hand, the buffering state is an error, buffering is suspended and CPU 6 is informed of the error ending status.

Then, if the ending status information indicates normal ending, CPU 6 clears the retrial counter to 0, and continues to watch the buffering state until all the data, the reproduction of which was requested by the host computer 8, have been read (FIG. 27, Steps S2707→S2708→S2709). If, on the other hand, the ending status information indicates error ending, it is judged whether an indication that "real time reproduction is important" is given by the parameter of the read command issued by the host computer 8 (FIG. 27, Step S2712).

And if an indication that "real time reproduction is important" is given by the parameter of the reproduction request issued by the host computer 8, CPU 6 checks the address of the block where an error occurred against the address of the defective block registered on the defective block list (FIG. 27 Step S2713).

In case an indication that "real time reproduction is important" is not given by the parameter of the reproduction request issued by the host computer 8 or the two checked addresses are not identical, CPU 6 increments the retrial counter (FIG. 27, Step S2717), and judges if the retrial counter has exceeded the predetermined upper limit of retrials.

And if the retrial counter has not exceeded the upper limit of retrials, CPU 6 issues to the optical disk controller 5 a read command to retry reading the block where the reading error occurred (FIG. 27, Steps S2710→S2705→S2706→S2707→S2708). If, on the other hand, the retrial counter has exceeded the upper limit of retrials, CPU 6 gives up reading the block where the reading error occurred and issues to the optical disk controller 5 a read command to read the next block (FIG. 27, Steps S2719→S271→S2705→S2706→S2707→S2708).

If, on the other hand, the two addresses checked are found to be identical, the SLR flag of the defective block is further checked. And if the SLR flag is "1," the block where the error occurred is an RTR defective block, and CPU 6 processes the defective block in the following way.

That is, CPU 6 increments the retrial counter for defective blocks (FIG. 27, Step S2714), and judges whether the retrial counter for defective blocks has exceeded the upper limit of reading retrials thus worked out for defective blocks.

And if the retrial counter for defective blocks has not exceeded the upper limit of retrials for defective blocks, CPU 6 issues to the optical disk controller 5 a read command to retry reading the defective block (FIG. 27, Steps S2710→S2705→S2706→S2707→S2708). If, on the other hand, the retrial counter for defective blocks has exceeded the upper limit of retrials for defective blocks, CPU 6 gives up reading the block where the reading error occurred and issues to the optical disk controller 5 a read command to read the next block (FIG. 27, Steps S2716→S2711→S2705→S2706→S2707→S2708).

As set forth above, the present embodiment can achieve the same effect as Embodiment 9 only when an indication that "real time reproduction is important" is given by the parameter of the reproduction request issued by the host computer 8.

What is claimed is:

1. A disk reproducing apparatus wherein a defective block list with information registered thereon has been acquired from a recording medium, said information showing defective blocks and alternative blocks linked to each other alone with types of defective blocks and, when there arises need to read out a defective block from said recording medium, a corresponding alternative block is read out and forwarded to a production requester, said apparatus comprising:
reading control means for identifying the type of the defective block registered on the defective block list and controlling the reading according to the identification results only when an indication that real time reproduction is important is indicated by said reproduction requester.

2. The disk reproducing apparatus as defined in claim 1, wherein in case a block to be read is a defective block of a specific type, said reading control means so controls the reading that said defective block is not read out but the next block is read out.

3. The disk reproducing apparatus as defined in claim 1, wherein said reading control means so controls the reading that in case a read block is a defective block of a specific type, the reading process is continued without interruption and the next black is read out even if reading out said defective block is an error.

4. The disk reproducing apparatus as defined in claim 1, wherein said reading control means so controls the reading that in case a read block is a defective block of a specific type, the reading process is continued without retrying reading said defective block and the next block is read out.

5. The disk reproducing apparatus as defined in claim 1, wherein said reading control means so controls the reading that in case a read block is a defective block of a specific type, reading said defective block is retried a specific number of times.

6. The disk reproducing apparatus as defined in claim 1, wherein said reading control means so controls the reading as to work out the number of reading retrials per defective block on the basis of the number of read blocks, the number of blocks to be read and the number of defective blocks present among the blocks to be read and to retry reading out the defective blocks of a specific type a maximum of that number of times.

7. The disk reproducing apparatus as defined in claim 1, wherein said reading control means so controls the reading as to work out the number of reading retrials per defective block on the basis of the distribution ratio of defective blocks, the speed at which blocks are read out from the recording medium and the speed at which the read blocks are forwarded to the reproduction requester and to retry reading out the defective blocks of a specific type a maximum of that number of times.

8. The disk reproducing apparatus as defined in claim 1, wherein defective blocks of said specific type are real time recording defective blocks.

9. A disk reproducing method wherein a defective block list with information registered thereon has been acquired from a recording medium, said information showing defective blocks and alternative blocks linked to each other along with types of defective blocks and, when there arises need to read out a defective block from said recording medium, a corresponding alternative block is read out and forwarded to a production requester, said method comprising the reading control steps of:
identifying the type of defective blocks registered on said defective block list and controlling the reading according to the identification results only when an indication that real time reproduction is important is indicated by said reproduction requester.

10. The disk reproducing method as defined in claim 9, wherein said reading control steps so control the reading that in case a block to be read is a defective block of a specific type, said defective block will not be read out but the next block will be read out.

11. The disk reproducing method as defined in claim 9, wherein said reading control steps so control the reading that in case a block read out is a defective block of a specific type and even if the reading of the block is an error, the process will be continued without interruption and the next block will be read out.

12. The disk reproducing method as defined in claim 9, wherein said reading control steps so control the reading that in case a block read out is a defective block of a specific type, reading said defective block will not be retried but the next block will be read out.

13. The disk reproducing method as defined in claim 9, wherein said reading control steps so control the reading that in case a block read out is a defective block of a specific type, reading said defective block will be retried a specific number of times.

14. The disk reproducing method as defined in claim 9, wherein said reading control steps so control the reading as to work out the number of reading retrials per defective block on the basis of the number of read blocks, the number of blocks to be read and the number of defective blocks present among the blocks to be read and to retry reading out the defective block of a specific type a maximum of that number of times.

15. The disk reproducing method as defined in claim 9, wherein said reading control steps so control the reading as to as to work out the number of reading retrials per defective block on the basis of the distribution ratio of defective blocks, the speed at which blocks are read out from the recording medium and the speed at which the read blocks are forwarded to the reproduction requester and to retry reading out the defective block of a specific type a maximum of that number of times.

16. The disk reproducing method as defined in claim 9, wherein defective blocks of said specific type are real time recording defective blocks.

* * * * *

UNITED STATES PATENT AND TRADEMARK OFFICE
CERTIFICATE OF CORRECTION

PATENT NO.    : 6,873,584 B2
DATED         : March 29, 2003
INVENTOR(S)   : Masayuki Imada et al.

It is certified that error appears in the above-identified patent and that said Letters Patent is hereby corrected as shown below:

Column 31,
Line 43, change "to each other alone" to -- to each other along --;
Line 63, change "the next black is read out" to -- the next block is read out --.

Signed and Sealed this

Ninth Day of August, 2005

JON W. DUDAS
*Director of the United States Patent and Trademark Office*